United States Patent
Lee et al.

(10) Patent No.: US 9,706,156 B2
(45) Date of Patent: Jul. 11, 2017

(54) IMAGE SENSOR FOR CONTROLLING A TRANSMISSION SPEED OF SENSED IMAGE DATA AND IMAGE PROCESSING SYSTEM INCLUDING THE SAME

(71) Applicant: Samsung Electronics Co., Ltd., Suwon-Si, Gyeonggi-Do (KR)

(72) Inventors: Hyeok Jong Lee, Seongnam-si (KR); Jin Ho Seo, Seoul (KR); Young Tae Jang, Pyeongtaek-si (KR); Sung Ho Suh, Hwaseong-si (KR); Jin Young Jeong, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 25 days.

(21) Appl. No.: 14/518,085

(22) Filed: Oct. 20, 2014

(65) Prior Publication Data

US 2015/0304583 A1    Oct. 22, 2015

(30) Foreign Application Priority Data

Apr. 18, 2014 (KR) ........................ 10-2014-0046988

(51) Int. Cl.
| | |
|---|---|
| *H04N 5/76* | (2006.01) |
| *H04N 3/14* | (2006.01) |
| *H04N 5/343* | (2011.01) |
| *H04N 5/374* | (2011.01) |

(52) U.S. Cl.
CPC ............. *H04N 5/76* (2013.01); *H04N 3/1593* (2013.01); *H04N 5/343* (2013.01); *H04N 5/3742* (2013.01)

(58) Field of Classification Search
CPC ........ H04N 5/76; H04N 3/1593; H04N 5/343; H04N 5/3742; H04N 5/345; H04N 5/3452; H04N 5/3458
See application file for complete search history.

(56) References Cited

U.S. PATENT DOCUMENTS

| | | | |
|---|---|---|---|
| 5,901,332 A | 5/1999 | Gephardt et al. | |
| 6,791,615 B1 * | 9/2004 | Shiomi ................ | H04N 3/1575 348/218.1 |

(Continued)

FOREIGN PATENT DOCUMENTS

| | | | |
|---|---|---|---|
| KR | 1142224 A | 3/2006 | |
| KR | 0728650 A | 1/2007 | |

(Continued)

*Primary Examiner* — Nicholas Giles
(74) *Attorney, Agent, or Firm* — Harness, Dickey & Pierce P.L.C.

(57) ABSTRACT

In one embodiment, an image sensor includes a pixel array including a plurality of pixels, an analog-to-digital converter configured to convert analog pixel signals output from the pixels into digital signals, a first cluster configured to store a first group of digital signals among the digital signals and to output first image data, a second cluster configured to store a second group of digital signals among the digital signals and to output second image data, and at least one cluster switch connected to the first cluster and the second cluster, a first channel, and a second channel. The image sensor is configured to transmit at least one among the first image data and the second image data to at least one among the first channel and the second channel based on an operation mode.

20 Claims, 16 Drawing Sheets

(56) References Cited

U.S. PATENT DOCUMENTS

| | | | |
|---|---|---|---|
| 7,106,370 B2 * | 9/2006 | Shiomi | H04N 5/2176 348/218.1 |
| 7,129,979 B1 | 10/2006 | Lee | |
| 7,667,757 B2 * | 2/2010 | Ikeda | H04N 3/1525 348/294 |
| 7,768,677 B2 * | 8/2010 | Kawai | H04N 5/361 358/474 |
| 7,876,362 B2 * | 1/2011 | Krymski | H04N 5/32 250/208.1 |
| 7,889,260 B2 * | 2/2011 | Hagiwara | H04N 3/1575 348/316 |
| 8,063,964 B2 | 11/2011 | Kozlowski | |
| 8,175,408 B2 * | 5/2012 | Hagiwara | H04N 5/3653 348/316 |
| 8,432,761 B2 | 4/2013 | Kim et al. | |
| 8,438,426 B2 | 5/2013 | Li et al. | |
| 8,504,864 B2 | 8/2013 | Menon et al. | |
| 2002/0071046 A1 * | 6/2002 | Harada | H04N 3/1593 348/316 |
| 2007/0076109 A1 * | 4/2007 | Krymski | H04N 5/32 348/300 |
| 2007/0206238 A1 * | 9/2007 | Kawai | H04N 5/361 358/482 |
| 2009/0079859 A1 * | 3/2009 | Hagiwara | H04N 9/045 348/311 |
| 2010/0097507 A1 * | 4/2010 | Krymski | H04N 5/32 348/300 |
| 2010/0265316 A1 * | 10/2010 | Sali | H04N 13/0037 348/46 |
| 2013/0312248 A1 * | 11/2013 | Ciccarelli | H05K 13/00 29/592.1 |

FOREIGN PATENT DOCUMENTS

| | | |
|---|---|---|
| KR | 0874671 A | 10/2008 |
| KR | 20120006146 A | 1/2012 |
| KR | 20120053456 A | 5/2012 |

\* cited by examiner

IMAGE SENSOR FOR CONTROLLING A TRANSMISSION SPEED OF SENSED IMAGE DATA AND IMAGE PROCESSING SYSTEM INCLUDING THE SAME

CROSS-REFERENCE TO RELATED APPLICATIONS

This application claims priority under 35 U.S.C. §119(a) from Korean Patent Application No. 10-2014-0046988 filed on Apr. 18, 2014, the disclosure of which is hereby incorporated by reference in its entirety.

BACKGROUND

Embodiments of the inventive concepts relate to an image sensor, and more particularly, to an image sensor for controlling a transmission speed of sensed image data and a number of transmission channels based on variable channel interface and/or an image processing system including the same.

When image data is sensed and stored using a camera, the image data is acquired by an image sensor. The image sensor includes a plurality of pixels that sense light. The image data sensed by the pixels is stored in an internal memory within the image sensor. The image data is transmitted from the memory to an image signal processor (ISP), which is connected to the image sensor, to be processed. The size (or amount) of the image data transmitted from the image sensor to the ISP may vary with a number of pixels included in the image sensor and an available frame rate.

When the specification of an image sensor is determined, the image sensor is customized according to the specification. In this case, the power and/or area of circuits implemented in the image sensor can be optimized. However, when the specification is changed, the design of the image sensor changes according to the changed specification. This process takes a lot of time and is also costly.

SUMMARY

Some embodiments of the inventive concepts provide an image sensor for adjusting a transmission speed of sensed image data and a number of transmission channels based on a variable channel interface structure and/or an image processing system including the same.

According to some embodiments of the inventive concepts, there is provided an image sensor including a pixel array including a plurality of pixels, an analog-to-digital converter configured to convert analog pixel signals output from the pixels into digital signals, a first cluster configured to store a first group of digital signals among the digital signals and to output first image data, a second cluster configured to store a second group of digital signals among the digital signals and to output second image data, at least one cluster switch connected to the first cluster and the second cluster, a first channel, and a second channel. The image sensor is configured to transmit at least one among the first image data and the second image data to at least one among the first channel and the second channel based on an operation mode.

The first cluster may include a first buffer memory block configured to receive and store the first group of digital signal, a first data bus, a plurality of first column switches configured to transmit the first group of digital signals from the first buffer memory block to the first data bus, a first sense amplifier connected to the first channel, and a first bus switch connected between the first data bus and the first sense amplifier.

The second cluster may include a second buffer memory block configured to receive and store the second group of digital signal, a second data bus, a plurality of second column switches configured to transmit the second group of digital signals from the second buffer memory block to the second data bus, a second sense amplifier connected to the second channel, and a second bus switch connected between the second data bus and the second sense amplifier.

The at least one cluster switch may be connected between the first data bus and the second data bus and may always be in an on-state.

The image sensor may further include a first physical layer (PHY) connected between the first channel and the first sense amplifier to change a protocol of output signals of the first sense amplifier and a second PHY connected between the second channel and the second sense amplifier to change a protocol of output signals of the second sense amplifier.

The at least one cluster switch may include a first cluster switch connected between the first channel and the first cluster, a second cluster switch and a third cluster switch connected in series between the first cluster and the second cluster, and a fourth cluster switch connected between the second cluster and the second channel.

The first cluster may include a plurality of first bank buffer units connected in series between the first cluster switch and the second cluster switch. The second cluster may include a plurality of second bank buffer units connected in series between the third cluster switch and the fourth cluster switch. Image data processed by the second bank buffer units may be transmitted to the first bank buffer units through the second and third cluster switches, which are connected to each other, based on the operation mode.

According to other embodiments of the inventive concepts, there is provided an image processing system including an image sensor and a first image signal processor connected with the image sensor through a first channel. The image sensor includes a pixel array including a plurality of pixels, an analog-to-digital converter configured to convert analog pixel signals output from the pixels into digital signals, a first cluster connected to the first channel to store and output a first group of digital signals among the digital signals, a second cluster configured to store and output a second group of digital signals among the digital signals, and at least one cluster switch connected between the first cluster and the second cluster.

The first cluster may include a first buffer memory block configured to receive and store the first group of digital signal, a first data bus, a plurality of first column switches configured to transmit the first group of digital signals from the first buffer memory block to the first data bus, a first sense amplifier connected to the first channel, and a first bus switch connected between the first data bus and the first sense amplifier.

The second cluster may be connected to the first image signal processor through a second channel. The second cluster may include a second buffer memory block configured to receive and store the second group of digital signal, a second data bus, a plurality of second column switches configured to transmit the second group of digital signals from the second buffer memory block to the second data bus, a second sense amplifier connected to the second channel, and a second bus switch connected between the second data bus and the second sense amplifier.

The at least one cluster switch may be connected between the first data bus and the second data bus.

The image processing system may further include a second image signal processor connected to the second cluster through a second channel. The second cluster may include a second buffer memory block configured to receive and store the second group of digital signal, a second data bus, a plurality of second column switches configured to transmit the second group of digital signals from the second buffer memory block to the second data bus, a second sense amplifier connected to the second channel, and a second bus switch connected between the second data bus and the second sense amplifier.

The image sensor and the first image signal processor may be formed on one silicon substrate. The first image signal processor may be embedded in the image sensor.

According to further embodiments of the inventive concepts, there is provided an image sensor including a plurality of column lines, a first cluster connected to a first group of column lines among the plurality of column lines to store first image data received from the first group of column lines, a second cluster connected to a second group of column lines among the plurality of column lines to store second image data received from the second group of column lines, at least one cluster switch connected between the first cluster and the second cluster, a first channel connected to the first cluster, and a second channel connected to the second cluster. At least one among the first image data and the second image data may be transmitted through at least one among the first channel and the second channel based on an operation mode.

BRIEF DESCRIPTION OF THE DRAWINGS

The above and other features and advantages of the inventive concepts will become more apparent by describing in detail example embodiments thereof with reference to the attached drawings in which.

DETAILED DESCRIPTION OF THE EMBODIMENTS

Figure 1:
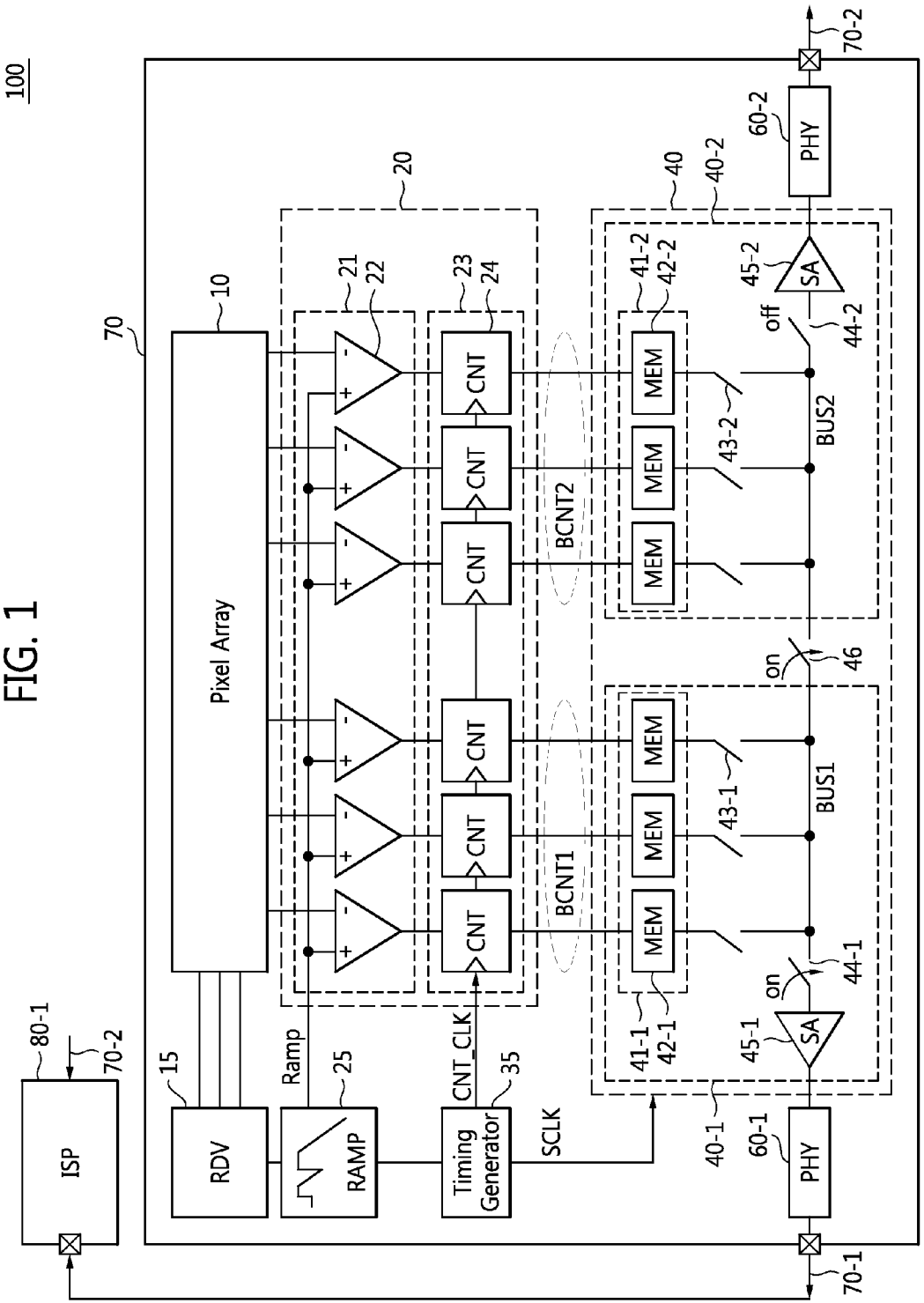
FIG. 1 is a block diagram of an image processing system according to some embodiments of the inventive concepts.

The inventive concepts now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of an image processing system 100 according to some embodiments of the inventive concepts. Referring to FIG. 1, the image processing system 100 includes an image sensor 70 that can change an image data transmission channel (simply referred to as a "channel") and a first image signal processor (ISP) 80-1.

The image sensor 70, e.g., a complementary metal-oxide semiconductor (CMOS) image sensor, includes a pixel array 10, a row driver 15, an analog-to-digital converter (ADC) 20, a buffer 40, a ramp signal generator 25, and a timing generator 35.

The pixel array 10 includes a plurality of pixels in an active region. The pixels may include a red pixel which converts light in the red spectrum into an electrical signal, a green pixel which converts light in the green spectrum into an electrical signal, and a blue pixel which converts light in the blue spectrum into an electrical signal. In addition, a color filter may be arrayed above each of the pixels to transmit light in a particular spectrum.

The row driver 15 may generate a plurality of control signals for controlling the light sensing operations of the pixels according to the control of the timing generator 35. The row driver 15 may drive the pixels in units of rows.

The ADC 20 converts signals output from the pixels into digital signals. The ADC 20 includes a comparison block 21 and a counter block 23.

The comparison block 21 includes a plurality of comparators 22 connected with the pixel array 10 and the ramp signal generator 25. An each output signal of the pixel array 10 is input to a first input terminal of each of the comparators 22 and a ramp signal Ramp output from the ramp signal generator 25 is input to a second input terminal of each comparator 22. Each comparator 22 may compare the each output signal of the pixel array 10 with the ramp signal Ramp from the ramp signal generator 25 and output a comparison result signal.

At this time, the comparison result signal output from each comparator 22 may correspond to a difference between a reset signal and an image signal that changes according to external illumination. The ramp signal Ramp is used to output the difference between the image signal and the reset signal. The difference between the image signal and the reset signal may be picked up and output in accordance with a slope of the ramp signal Ramp. The ramp signal generator 25 may operate based on a control signal generated by the timing generator 35.

The counter block 23 includes a plurality of counters 24. Each of the counters 24 is connected to an output terminal of corresponding one of the comparators 22. Each counter 24 counts the comparison result signal based on a counter clock signal CNT_CLK output from the timing generator 35 and outputs a digital signal corresponding to a count result.

For example, each counter 24 may function as a column counter. At this time, the counter clock signal CNT_CLK may be generated, based on a counter control signal generated by the timing generator 35, by a counter controller (not shown) that is implemented within the counter block 23 or is connected to the timing generator 35.

At this time, the counter block 23 includes an up/down counter or a bit-wise inversion counter. The bit-wise inversion counter may perform a similar operation to the up/down counter. For example, the bit-wise inversion counter has a function of performing up-count and a function of inverting all bits in a counter into a 1's complement in response to a certain signal, and therefore, the bit-wise inversion counter performs a reset count and inverts a count value into a 1's complement, i.e., a negative value using those functions.

The buffer 40 includes a first cluster 40-1 and a second cluster 40-2. The first cluster 40-1 may transmit digital signals BCNT1 in a first group among a plurality of digital signals output from the ADC 20 to a first channel 70-1 and/or a second channel 70-2 according to connection or disconnection of a cluster switch 46. The first cluster 40-1 includes a first buffer memory block 41-1, a plurality of first column switches 43-1, a first bus switch 44-1, and a first sense amplifier 45-1.

The second cluster 40-2 may transmit digital signals BCNT2 in a second group among a plurality of digital signals output from the ADC 20 to the first channel 70-1 and/or the second channel 70-2 according to connection or disconnection of the cluster switch 46. The second cluster 40-2 includes a second buffer memory block 41-2, a plurality of second column switches 43-2, a second bus switch 44-2, and a second sense amplifier 45-2.

The first buffer memory block 41-1 includes a plurality of buffer memories 42-1 and the second buffer memory block 41-2 includes a plurality of buffer memories 42-2. The buffer memories 42-1 and 42-2 may operate according to a control signal generated by the timing generator 35 or a buffer control signal generated by a memory controller (not shown) connected to each of the buffer memory blocks 41-1 and 41-2 or the timing generator 35. Each of the buffer memories 42-1 and 42-2 may be implemented using volatile memory such as static random access memory (SRAM).

The column switches 43-1 and 43-2 and the bus switches 44-1 and 44-2 are used to deliver an output signal of each of the buffer memories 42-1 and 42-2, which is selected according to a buffer clock signal SCLK generated by the timing generator 35 and a buffer control signal generated by the memory controller, to the sense amplifier 45-1 or 45-2 through data buses BUS1 and BUS2.

According to a buffer control signal, each of the buffer memory blocks 41-1 and 41-2 temporarily stores an output signal of the ADC 20 and then outputs the signal to the sense amplifier 45-1 or 45-2 through the switches 43-1 and 44-1 or the switches 43-2 and 44-2.

The first sense amplifier 45-1 senses and amplifies an output signal of the first bus switch 44-1 and outputs an amplified signal. The second sense amplifier 45-2 senses and amplifies an output signal of the second bus switch 44-2 and outputs an amplified signal. Each of the buffer memory blocks 41-1 and 41-2 may include a latch (not shown) that stores a sensed output. The latch may be connected to an output of the sense amplifier 45-1 or 45-2 or may be integrated into the sense amplifier 45-1 or 45-2.

The cluster switch 46 controls the connection between the first data bus BUS1 corresponding to the first cluster 40-1 and the second data bus BUS2 corresponding to the second cluster 40-2. Although the cluster switch 46 is positioned between the first cluster 40-1 and the second cluster 40-2 in the embodiments illustrated in FIG. 1, the cluster switch 46 may be positioned within one of the first cluster 40-1 and the second cluster 40-2 in other embodiments. The timing generator 35 outputs control signals for controlling the operations of the elements 15, 25, 20, and 40.

The image sensor 70 may include a first physical layer (PHY) 60-1 that may convert and transmit an output signal of the sense amplifier 45-1 of the first cluster 40-1 according to a first communication protocol. The image sensor 70 may also include a second PHY 60-2 that may convert and transmit an output signal of the sense amplifier 45-2 of the second cluster 40-2 according to a second communication protocol. The first PHY 60-1 and the second PHY 60-2 may indicate an interface.

The first and second communication protocols may be a mobile industry processor interface (MIPI®) protocol, but they are not limited thereto. The first and second communication protocols may be a different communication protocol from the MIPI® protocol and may have transmission features different from MIPI transmission features.

The image sensor 70 may transmit image data corresponding to output signals of the pixel array 10 to the first ISP 80-1 through the first PHY 60-1 or the second PHY 60-2. For example, the first ISP 80-1 may receive the image data from the buffer 40, may process the image data to be nice for people to look at, and may transmit processed data to another image processing device (not shown).

Although the first ISP 80-1 is positioned outside the image sensor 70 in the embodiments illustrated in FIG. 1, the first ISP 80-1 may be positioned within the image sensor 70 in other embodiments. When the first ISP 80-1 is positioned within the image sensor 70, the first PHY 60-1 may be omitted in terms of design.

The first ISP 80-1 may be selectively connected to either the first PHY 60-1 or the second PHY 60-2. An ISP connected to each PHY 60-1 or 60-2 may have a different specification. For example, the ISP may be a high performance ISP, i.e., big ISP or a low-power ISP, i.e., little ISP.

The image sensor 70 illustrated in FIG. 1 includes a structure in which image data corresponding to output signals of the pixel array 10 is transmitted to a single channel or a plurality of channels.

In detail, as shown in FIG. 1, when the first bus switch 44-1 of the first cluster 40-1 is turned on, the second bus switch 44-2 of the second cluster 40-2 is turned off, and the cluster switch 46 is turned on; all image data stored in the buffer 40 is transmitted to the first ISP 80-1 through the first PHY 60-1 and the first channel 70-1. In other words, the image sensor 70 may control the bus switches 44-1 and 44-2 and the cluster switch 46 to deliver image data to the first ISP 80-1 through one channel 70-1.

However, when the first bus switch 44-1 of the first cluster 40-1 is turned off, the second bus switch 44-2 of the second cluster 40-2 is turned on, and the cluster switch 46 is turned on; all image data stored in the buffer 40 is transmitted to the first ISP 80-1 through the second PHY 60-2 and the second channel 70-2. In other words, the image sensor 70 may control the bus switches 44-1 and 44-2 and the cluster switch 46 to deliver image data to the first ISP 80-1 through one channel 70-2. At this time, the cluster switch 46 may be replaced with a transmission line.

The image processing system 100 illustrated in FIG. 1 includes two channels 70-1 and 70-2. When the image sensor 70 is connected to an external ISP or an external signal processing device, package bonding is easy. In addition, since the image sensor 70 is closely connected with the external ISP or the external signal processing device, noise is reduced in the image processing system 100.

In addition, each of the first PHY 60-1 and the second PHY 60-2 may have different performance, power, transmission feature or protocol according to a type of external ISP connected thereto.

The first ISP 80-1 may be embedded in the image sensor 70 in other embodiments. When the first ISP 80-1 is an embedded ISP, the first PHY 60-1 may not be implemented. When the first ISP 80-1 is an embedded ISP, the image sensor 70 may transmit image data to an external ISP without running the first ISP 80-1. For example, when an embedded first ISP is a low-power ISP or a low performance ISP, an external ISP may be a high performance ISP.

Figure 2:
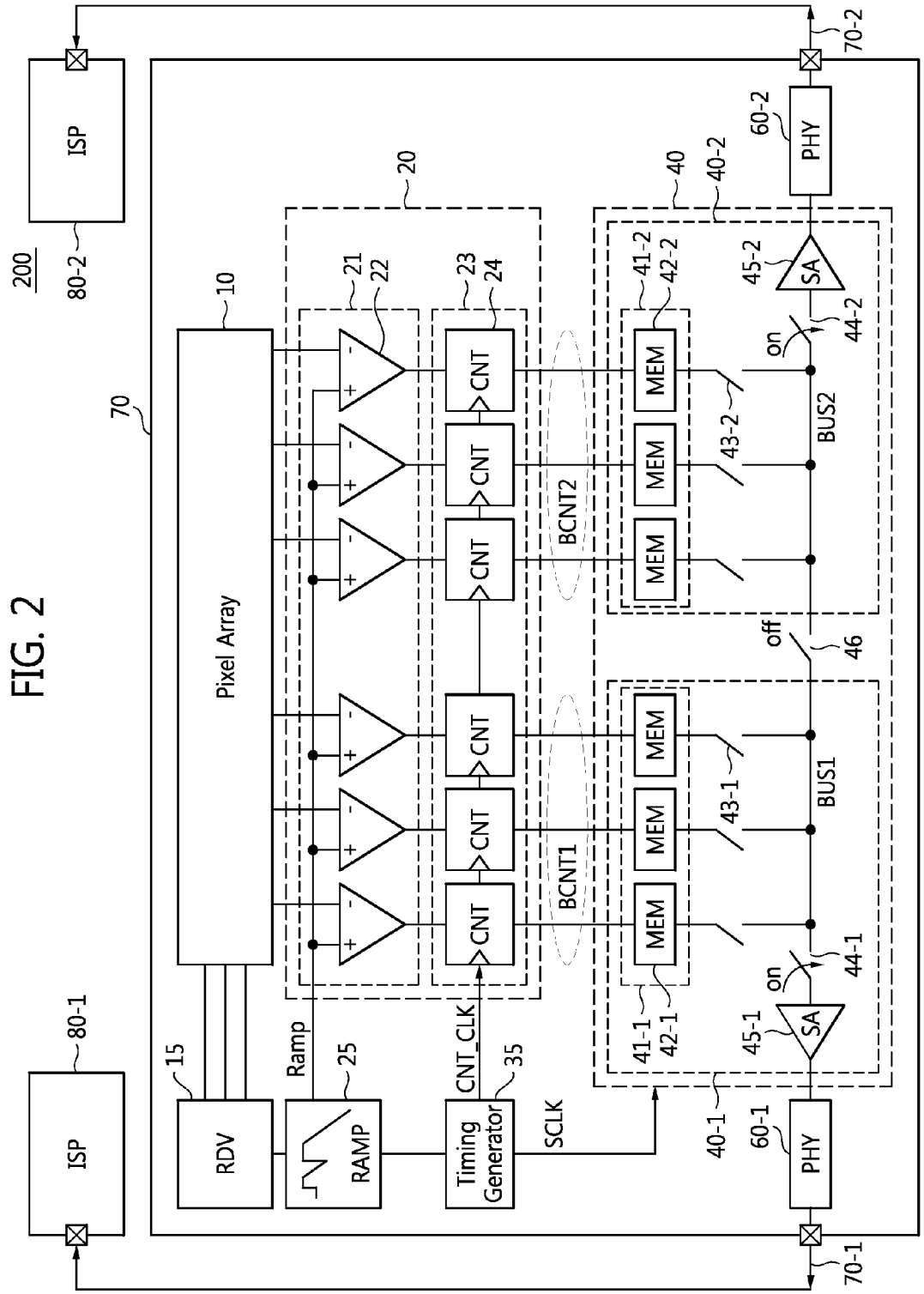
FIG. 2 is a block diagram of an image processing system according to other embodiments of the inventive concepts.

FIG. 2 is a block diagram of an image processing system 200 according to other embodiments of the inventive concepts. Referring to FIG. 2, the image processing system 200 includes an image sensor 70, a first ISP 80-1, and a second ISP 80-2. The image sensor 70 illustrated in FIG. 2 includes the same elements as the image sensor 70 illustrated in FIG. 1.

The first PHY 60-1 in the image sensor 70 receives image data from the first cluster 40-1 and transmits the image data to the first ISP 80-1 through the first channel 70-1 according to a first communication protocol. The second PHY 60-2 receives image data from the second cluster 40-2 and transmits the image data to the second ISP 80-2 through the second channel 70-2 according to a second communication protocol. At this time, the first communication protocol may be the same as the second communication protocol. For example, the first communication protocol and the second communication protocol may be a MIPI protocol. However, they are not restricted to the MIPI protocol and may be a different protocol according to a type of an external ISP.

The image sensor 70 illustrated in FIG. 2 includes a structure in which image data generated from the pixel array 10 is transmitted to either a single channel 70-1 or 70-2 or a plurality of channels 70-1 and 70-2.

In detail, as shown in FIG. 2, when both the first bus switch 44-1 of the first cluster 40-1 and the second bus switch 44-2 of the second cluster 40-2 are turned on and the cluster switch 46 is turned off, image data stored in the first buffer memory block 41-1 is transmitted to the first ISP 80-1 through the first PHY 60-1 and image data stored in the second buffer memory block 41-2 is transmitted to the second ISP 80-2 through the second PHY 60-2. In other words, the image sensor 70 may control the bus switches 44-1 and 44-2 and the cluster switch 46 to transmit image data from the first cluster 40-1 and image data from the second cluster 40-2 to the ISPs 80-1 and 80-2, respectively, through the channels 70-1 and 70-2, respectively.

The first cluster 40-1 and the second cluster 40-2 are defined by grouping columns of the pixel array 10 into clusters. The size of a cluster may vary with different embodiments. Although only two clusters are illustrated in the embodiments illustrated in FIGS. 1 and 2 for clarity of the description, the scope of the inventive concepts are not limited to these embodiments. The number of image data transmission channels (i.e., channels) for the image sensor 70 may increase according to the number of clusters.

In the embodiments illustrated in FIG. 2, the first ISP 80-1 and the second ISP 80-2 may be formed together on one silicon substrate or may be respectively formed on different silicon substrates. At least one of the ISPs 80-1 and 80-2 may be embedded in the image sensor 70 or may be implemented outside the image sensor 70. When at least one of the ISPs 80-1 and 80-2 is embedded in the image sensor 70, the first PHY 60-1 and/or the second PHY 60-2 respectively connected to the ISPs 80-1 and 80-2 may be omitted from the image sensor 70.

Figure 3:
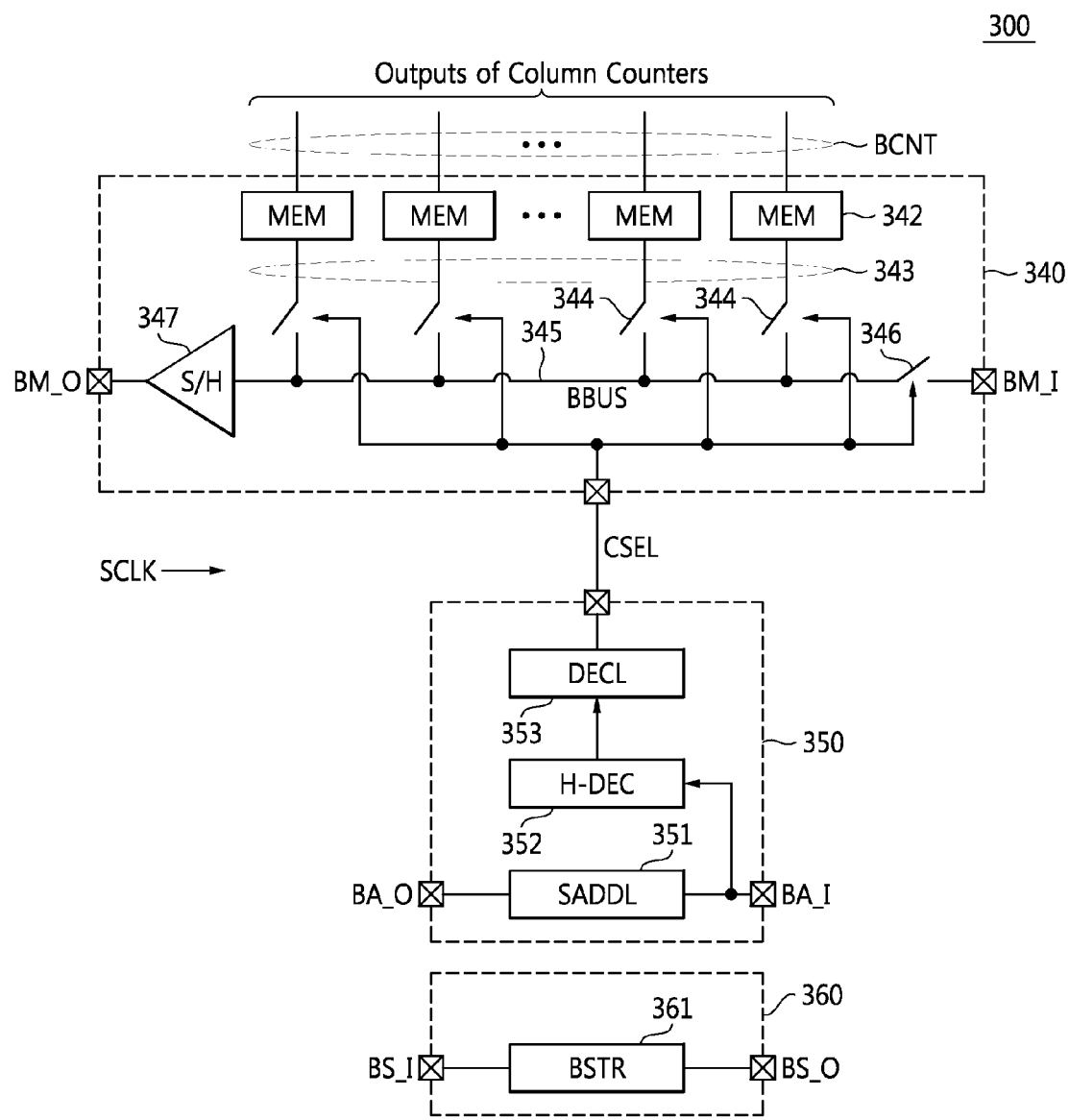
FIG. 3 is a block diagram of a buffer bank according to some embodiments of the inventive concepts.

FIG. 3 is a block diagram of a buffer bank 300 according to some embodiments of the inventive concepts. The buffer bank 300 may receive a bank address, may receive image data corresponding to the bank address from a pixel array and store the image data, and may shift and output the stored image data. Referring to FIG. 3, the buffer bank 300 includes a bank buffer unit 340 and a bank address unit 350.

The bank buffer unit 340 includes a plurality of buffer memories 342, a plurality of column switches 344 respectively connected to the buffer memories 342, a cluster switch 346, a bank bus 345 connected to the column switches 344 and the cluster switch 346, and a sense amplifier 347 connected to the bank bus 345.

The bank buffer unit 340 stores first image data corresponding to a bank counter input BCNT in the buffer memories 342. The bank counter input BCNT corresponds to each of banks into which outputs of the ADC 20 of the image sensor 70 illustrated in FIG. 1 or 2 are grouped. For example, a group of the digital signals BCNT1 or BCNT2 illustrated in FIG. 1 or 2 may correspond to the bank counter input BCNT.

The bank buffer unit 340 also receives second image data corresponding to a bank image input BM_I. The bank buffer unit 340 receives a switch control signal through a column selection input CSEL. The switch control signal includes control signals for controlling each of the column switches 344 and the cluster switch 346. The bank buffer unit 340 may turn off the cluster switch 346 and turn on one of the column switches 344 based on the switch control signal, so that the first image data is transmitted to the bank bus 345. The bank buffer unit 340 may turn off all of the column switches 344 and turn on the cluster switch 346 based on the switch control signal, so that the second image data is transmitted to the bank bus 345.

It may be designed that the bank bus 345 and the buffer memories 342 have the same bus width, but the inventive concepts are not limited thereto. When necessary, it may be designed that the bank bus 345 has a different bus width than the buffer memories 342 in order to transmit additional information. The buffer memories 342 may include SRAM cells and may output a bit line signal and a complementary bit line signal.

The number of the buffer memories 342 in the bank buffer unit 340 may be 512, 1024, or 2048 but is not limited thereto. The number of the buffer memories 342 may vary with at least one among the numbers of columns, banks and clusters in the image sensor 70.

The number of bits stored in each of the buffer memories 342 may vary from 10 to 15 but is not limited thereto. The number of bits stored in each of the buffer memories 342 may vary with the number of color levels that can be expressed by each of the pixels included in the pixel array 10 of the image sensor 70.

A plurality of bank buffer units having the same structure as the bank buffer unit 340 may be connected in a single pipeline chain, which will be described in detail with reference to FIGS. 4 and 6 and FIGS. 10 through 13.

The column switches 344 and the cluster switch 346 may deliver either the first image data corresponding to an output 343 of the buffer memories 342 or the second image data corresponding to the bank image input BM_I to the bank bus 345 according to an output of a decoder latch 353 of the bank address unit 350.

The sense amplifier 347 receives the first or second image data delivered to the bank bus 345 through the column switches 344 or the cluster switch 346 and senses and amplifies the image data to output a bank image output BM_O. For example, the sense amplifier 347 may have a hold function. The sense amplifier 347 may store the first or second image data in synchronization with the buffer clock signal SCLK. When the second image data is selected, the sense amplifier 347 may just pass or store the second image data.

The bank address unit 350 includes an address latch 351, an address decoder 352, and the decoder latch 353.

The address latch 351 stores a first bank address input through a bank address input BA_I and outputs the stored first bank address to a bank address output BA_O in synchronization with the buffer clock signal SCLK.

The address decoder 352 decodes the first bank address input through the bank address input BA_I and determines whether the first bank address is the same as a current address of the buffer bank 300. At this time, the first bank address includes a bank address bit and a column address bit for turning on one of the column switches 344 and the cluster switch 346 in the bank buffer unit 340.

The decoder latch 353 latches an output of the address decoder 352 when the output of the address decoder 352 is stabilized. An output of the decoder latch 353 is provided as a control signal for each of the column switches 344 and the cluster switch 346.

According to some embodiments, the buffer bank 300 may also include a bank storage unit 360. The bank storage unit 360 may be used like a pipeline to shift an external bank input address BS_I and image data. For example, the bank storage unit 360 may shift the bank input address BS_I to output a bank output address BS_O. The shifting operation of the bank storage unit 360 will be described in detail together with the shifting operation of the bank buffer unit 340 and the shifting operation of the bank address unit 350.

Figure 4:
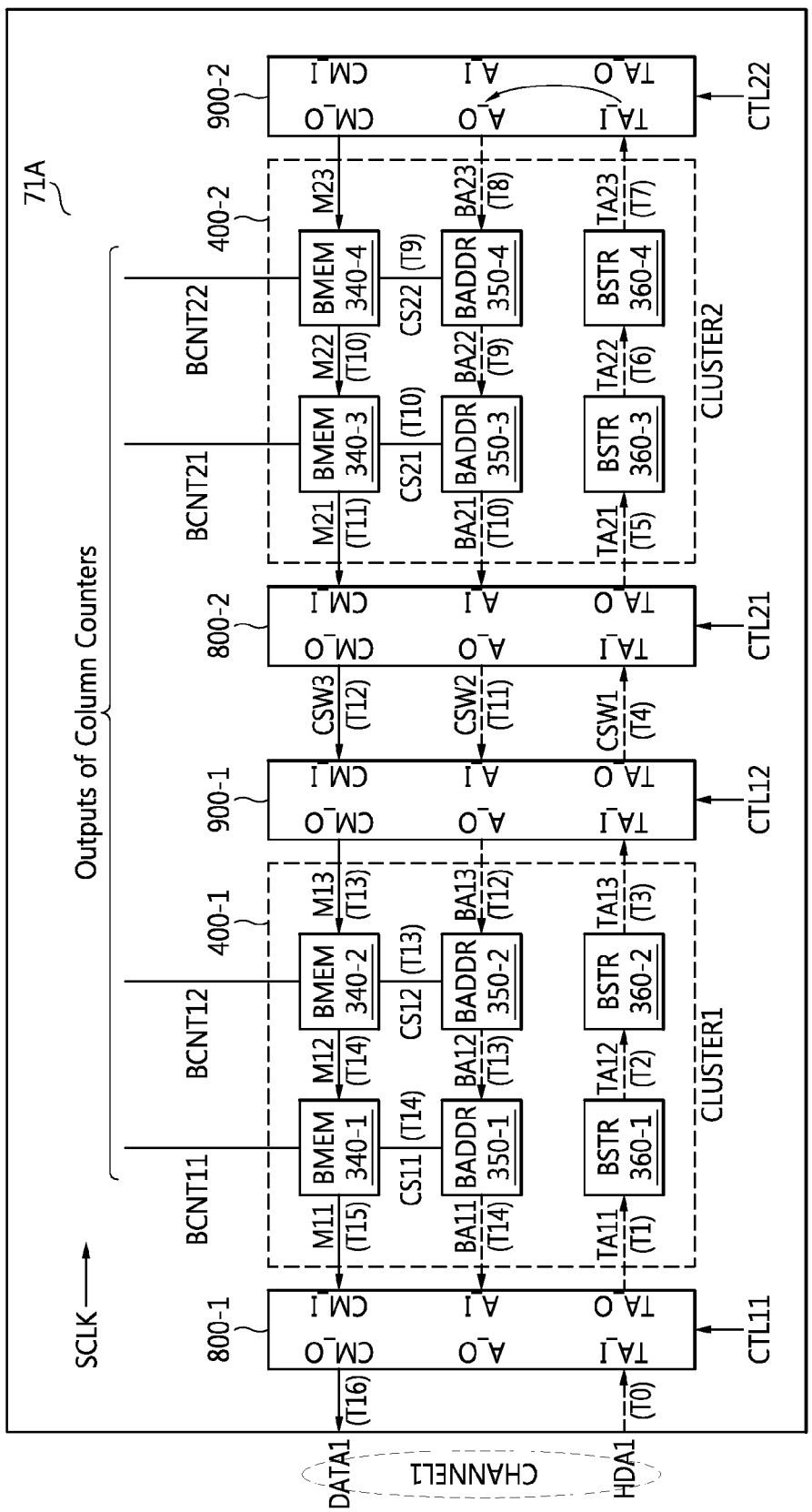
FIG. 4 is a block diagram of an image sensor according to some embodiments of the inventive concepts.

FIG. 4 is a block diagram of an image sensor 71A according to some embodiments of the inventive concepts. The image sensor 71A includes a structure which allows image data to be transmitted from a plurality of column lines a single channel or a plurality of channels.

Referring to FIG. 4, the image sensor 71A includes a first cluster 400-1, a second cluster 400-2, a first cluster switch 800-1, a second cluster switch 900-1, a third cluster switch 800-2, and a fourth cluster switch 900-2.

The first cluster 400-1 may include a plurality of bank buffer units 340-1 and 340-2, a plurality of bank address units 350-1 and 350-2, and a plurality of bank storage units 360-1 and 360-2. The second cluster 400-2 may include a plurality of bank buffer units 340-3 and 340-4, a plurality of bank address units 350-3 and 350-4, and a plurality of bank storage units 360-3 and 360-4.

The structure and the operations of each of the bank buffer units 340-1 through 340-4 are substantially the same as those of the bank buffer unit 340 illustrated in FIG. 3. Each of the bank buffer units 340-1 through 340-4 selectively stores one of two types of image data in synchronization with the buffer clock signal SCLK and outputs the stored image data to the next bank buffer unit. The bank buffer units 340-1 through 340-4 receive bank counter inputs BCNT11, BCNT12, BCNT21, and BCNT22, respectively.

The structure and the operations of each of the bank address units 350-1 through 350-4 are substantially the same as those of the bank address unit 350 illustrated in FIG. 3. Each of the bank address units 350-1 through 350-4 stores a bank address input through the bank address input BA_I and generates a column selection signal for corresponding one of the bank buffer units 340-1 through 340-4. Each of the bank address units 350-1 through 350-4 also outputs the stored bank address to the next bank address unit through the bank address output BA_O in synchronization with the buffer clock signal SCLK.

The structure and the operations of the bank storage units 360-1 through 360-4 are substantially the same as those of the bank storage unit 360 illustrated in FIG. 3. Each of the bank storage units 360-1 through 360-4 stores a bank input address or image data in synchronization with the buffer clock signal SCLK and outputs a bank output address or image data, which corresponds to the stored bank input address, to the next bank storage unit.

Each of the cluster switches 800-1, 900-1, 800-2, and 900-2 includes a plurality of latches (not shown) and a selector (not shown). The cluster switches 800-1, 900-1, 800-2, and 900-2 controls the flow of a bank address and/or image data corresponding to the bank address according to switch control signals CTL11, CTL12, CTL21, and CTL22, respectively.

The structure and the operations of the cluster switches 800-1, 900-1, 800-2, and 900-2 will be described in detail with reference to FIGS. 8 and 9 later. Therefore, input of a bank address and output of image data performed in the image sensor 71A will be described with reference to FIG. 4 here.

Referring to FIG. 4, the image sensor 71A outputs image data through a single channel CHANNEL1 in a first operation mode. The first operation mode may be set through the setting of an external pin of the image sensor 71A or interface with an external controller. The interface may be camera control interface (CCI), which may operate according to a protocol such as serial peripheral interface (SPI) or inter integrated circuit (I2C), but the inventive concepts are not restricted thereto. The first operation mode influences the switch control signals CTL11, CTL12, CTL21, and CTL22 and thus controls the flow of a bank address and/or image data in the image sensor 71A.

Figure 5:
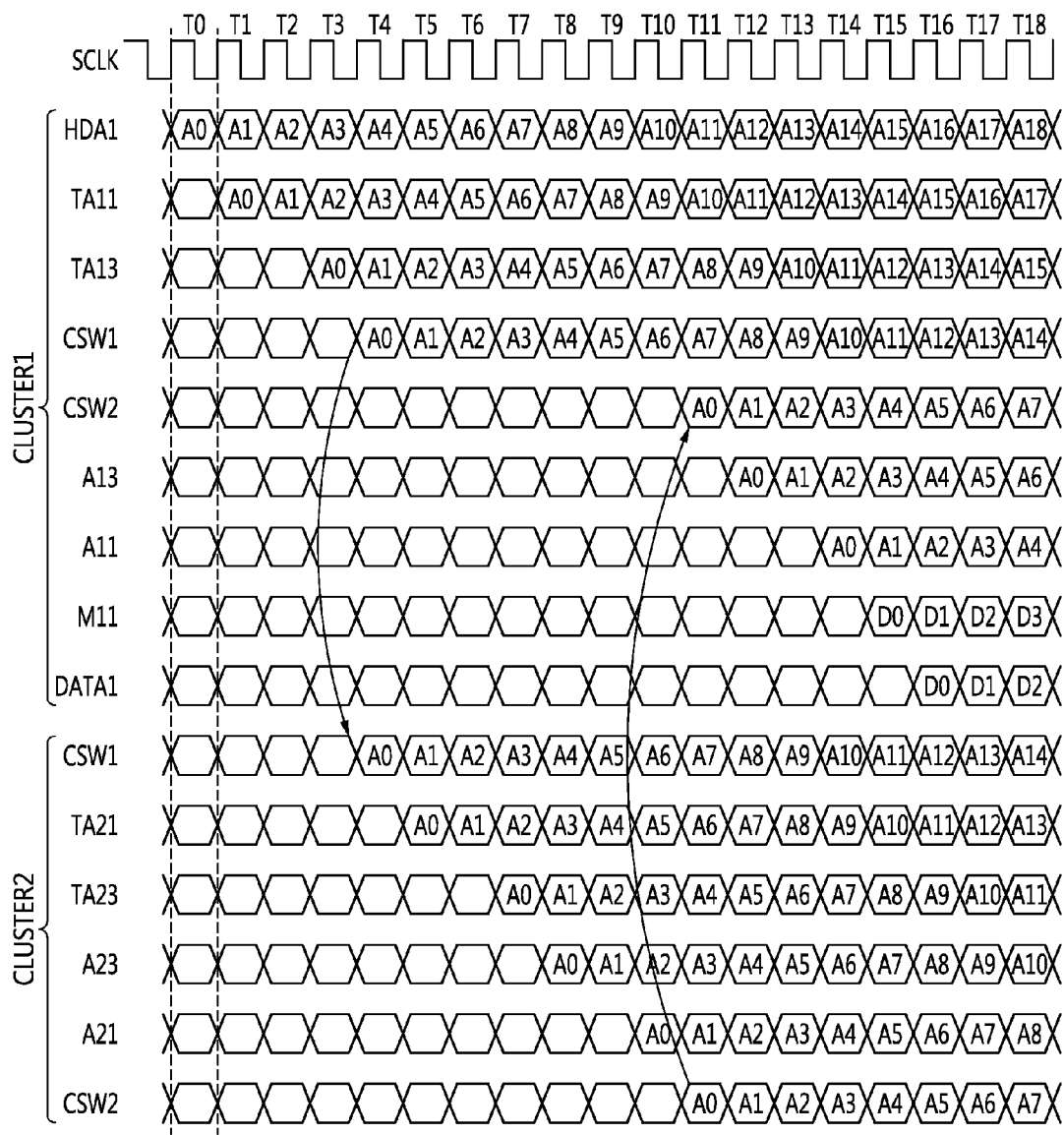
FIG. 5 is a timing chart showing the operation of the image sensor illustrated in FIG. 4.

FIG. 5 is a timing chart showing the operation of the image sensor 71A illustrated in FIG. 4. Referring to FIGS. 3 through 5, the image sensor 71A receives a first bank address A0 from a first bank address input HDA1 and transmits the first bank address A0 to a first address input TA_I of the first cluster switch 800-1 at a first clock cycle T0.

The first bank address A0 is shifted by a first internal latch of the first cluster switch 800-1 and is transmitted as a first address output signal TA11 to an input BS_I of the first bank storage unit 360-1 through an output TA_O of the first cluster switch 800-1 at a second clock cycle T1.

The first bank address A0 is shifted by an internal latch of the first bank storage unit 360-1 and transmitted as a first bank storage unit output signal TA12 to an input BS_I of the second bank storage unit 360-2 at a third clock cycle T2.

The first bank address A0 is shifted by an internal latch of the second bank storage unit 360-2 and transmitted as a second bank storage unit output signal TA13 to a first address input TA_I of the second cluster switch 900-1 at a fourth clock cycle T3.

The first bank address A0 is shifted by a first internal latch of the second cluster switch 900-1 and transmitted as a first address output signal CSW1 to a first address input TA_I of the second cluster 400-2 and to a first address input TA_I of the third cluster switch 800-2 through an output TA_O of the second cluster switch 900-1 at a fifth clock cycle T4.

The first bank address A0 is shifted by a first internal latch of the third cluster switch 800-2 and is transmitted as a first address output signal TA21 to an input BS_I of the third bank storage unit 360-3 through an output TA_O of the third cluster switch 800-3 at a sixth clock cycle T5.

The first bank address A0 is shifted by an internal latch of the third bank storage unit 360-3 and transmitted as a third bank storage unit output signal TA22 to an input BS_I of the fourth bank storage unit 360-4 at a seventh clock cycle T6.

The first bank address A0 is shifted by an internal latch of the fourth bank storage unit 360-4 and transmitted as a fourth bank storage unit output signal TA23 to a first address input TA_I of the fourth cluster switch 900-2 at an eighth clock cycle T7.

The first bank address A0 is shifted by a first internal latch of the fourth cluster switch 900-2 and transmitted as a second address output signal BA23 to an input BA_I of the fourth bank address unit 350-4 at a ninth clock cycle T8. At the same time, the first bank address A0 is decoded by the address decoder 352 in the fourth bank address unit 350-4.

The fourth bank address unit 350-4 generates a fourth selection signal CS22 and a fourth bank address output signal BA22 at a tenth clock cycle T9. In other words, as described with reference to FIG. 3 above, the decoder latch 353 of the fourth bank address unit 350-4 latches an output signal of the address decoder 352 thereof to generate the fourth selection signal CS22 and outputs the fourth selection signal CS22 to the column selection input CSEL of the fourth bank buffer unit 340-4. Meanwhile, the first bank address A0 is shifted by the address latch 351 in the fourth bank address unit 350-4 and transmitted as the fourth bank address output signal BA22 to a bank address input BA_I of the third bank address unit 350-3.

The third bank address unit 350-3 generates a third selection signal CS21 and a third bank address output signal BA21 at an eleventh clock cycle T10. In other words, as described with reference to FIG. 3 above, the decoder latch 353 of the third bank address unit 350-3 latches an output signal of the address decoder 352 of the third bank address unit 350-3 to generate the third selection signal CS21 and outputs the third selection signal CS21 to a column selection input CSEL of the third bank buffer unit 340-3. Meanwhile, the first bank address A0 is shifted by the address latch 351 in the third bank address unit 350-3 and transmitted as the third bank address output signal BA21 to a second address input A_I of the third cluster switch 800-2.

At the eleventh clock cycle T10, the fourth bank buffer 340-4 selects first image data input through the bank counter input BCNT22 of the fourth bank buffer 340-4 or second image data, i.e., M23 received through a bank image input BM_I of the fourth bank buffer 340-4 based on the fourth selection signal CS22 to generate fourth bank image data M22, as described with reference to FIG. 3 above.

The fourth bank image data M22 is transmitted as a fourth bank buffer data output signal M22 to a bank image input BM_I of the third bank buffer unit 340-3. Meanwhile, the fourth bank buffer 340-4 is the first bank buffer unit in a chain of the units 340-1 through 340-4 forming a bank buffer unit, and therefore, the second image data M23 may be ignored as invalid data.

The third bank buffer unit 340-3 selects either first image data input through the bank counter input BCNT21 of the third bank buffer unit 340-3 or second image data, i.e., M22 received through a bank image input BM_I of the third bank buffer unit 340-3 based on the third selection signal CS21 to generate third bank image data M21 at a 12th clock cycle T11. The third bank image data M21 is transmitted as a third bank buffer data output signal M21 to a column data input CM_I of the third cluster switch 800-2.

At the 12th clock cycle T11, the first bank address A0 input to the second address input A_I of the third cluster switch 800-2 is shifted by a second internal latch of the third cluster switch 800-2 and then transmitted as a second address output signal CSW2 to a second address input A_I of the second cluster switch 900-1 through an output A_O of the third cluster switch 800-2.

The third bank image data M21 input to the third cluster switch 800-2 is shifted by a third internal latch of the third cluster switch 800-2 and then transmitted as an image data output signal CSW3 to a column data input CM_I of the second cluster switch 900-1 through an output CM_O of the third cluster switch 800-2 at a 13th clock cycle T12. At the same time, the first bank address A0 input to the second cluster switch 900-1 is shifted by a second internal latch of the second cluster switch 900-1 and then transmitted to a bank address input BA_I of the second bank address unit 350-2.

The third bank image data M21 input to the second cluster switch 900-1 is shifted by a third internal latch of the second cluster switch 900-1 and then transmitted as an image data output signal M13 of the second cluster 400-2 to a bank image input BM_I of the second bank buffer unit 340-2 at a 14th clock cycle T13.

In addition, at the 14th clock cycle T13, the second bank address unit 350-2 generates a second selection signal CS12 and a second bank address output signal BA12. In other words, as described with reference to FIG. 3 above, the decoder latch 353 of the second bank address unit 350-2 latches an output signal of the address decoder 352 of the second bank address unit 350-2 to generate the second selection signal CS12 and outputs the second selection signal CS12 to a column selection input CSEL of the second bank buffer unit 340-2. Meanwhile, the first bank address A0 is shifted by the address latch 351 in the second bank address unit 350-2 and then transmitted as the second bank address output signal BA12 to a bank address input BA_I of the first bank address unit 350-1.

The second bank buffer unit 340-2, as described with reference to FIG. 3, selects either first image data input through the bank counter input BCNT12 of the second bank buffer unit 340-2 or second image data, i.e., M13 received through a bank image input BM_I of the second bank buffer unit 340-2 based on the second selection signal CS12 to generate second bank image data M12 at a 15th clock cycle T14. The second bank image data M12 is transmitted as a second bank buffer data output signal M12 to a bank image input BM_I of the first bank buffer unit 340-1.

In addition, at the 15th clock cycle T14, the first bank address unit 350-1 generates a first selection signal CS11 and a first bank address output signal BA11. In other words, as described with reference to FIG. 3 above, the decoder latch 353 of the first bank address unit 350-1 latches an output signal of the address decoder 352 of the first bank address unit 350-1 to generate the first selection signal CS11 and outputs the first selection signal CS11 to a column selection input CSEL of the first bank buffer unit 340-1. Meanwhile, the first bank address A0 is shifted by the address latch 351 in the first bank address unit 350-1 and then transmitted as the first bank address output signal BA11 to a second address input A_I of the first cluster switch 800-1.

The first bank buffer unit 340-1, as described with reference to FIG. 3, selects either first image data input through the bank counter input BCNT11 of the first bank buffer unit 340-1 or second image data, i.e., M12 received through the bank image input BM_I of the first bank buffer unit 340-1 based on the first selection signal C11 to generate first bank image data M11 at a 16th clock cycle T15. The first bank image data M11 is transmitted as a first bank buffer data output signal M11 to a buffer memory input CM_I of the first cluster switch 800-1.

The first bank image data M11 input to the first cluster switch 800-1 is shifted by a third internal latch of the first cluster switch 800-1 and output as first bank image data output DATA1. The first bank image data M11, i.e., the first bank image data output DATA1 may be transmitted to the first ISP 80-1 via the first PHY 60-1 illustrated in FIG. 1 or FIG. 2. The first bank address input HDA1 and the first bank image data output DATA1 form the first channel CHANNEL1.

As described above, the image sensor 71A illustrated in FIG. 4 outputs image data through the single channel CHANNEL1 in the first operation mode and may receive random or consecutive bank addresses and output image data corresponding to the addresses to the first channel CHANNEL1.

The structure of the cluster switches 800-1, 900-1, 800-2, and 900-2 is not restricted to the embodiments illustrated in FIG. 4, but the cluster switches 800-1, 900-1, 800-2, and 900-2 may be omitted or combined with each other according to the length of a transmission line and a design specification. The internal latches of the cluster switches 800-1, 900-1, 800-2, and 900-2 may be omitted according to the design specification.

Transmission of bank addresses and image data in the image sensor 71A may be performed using a pipeline chain. For example, the first cluster switch 800-1 receives a second bank address A1 at the second clock cycle T1 and may receive other bank addresses consecutively at each clock cycle thereafter like a pipeline. Transmission of a bank address or image data occurring at each clock cycle is performed in the same manner as that described above, so that a single image data pipeline is formed, which will be described with reference to FIG. 5.

With reference to FIGS. 4 and 5, the image sensor 71A receives the first bank address A0 through the first bank address input HDA1 in synchronization with the buffer clock signal SCLK. Thereafter, consecutive bank addresses A1 through A18 may be input to the image sensor 71A at clock cycles T1 through T18, respectively.

The bank addresses A0 through A18 are sequentially transferred through the cluster switches 800-1, 900-1, 800-2, and 900-2, the bank address units 350-1 through 350-4, and the bank storage units 360-1 through 360-4. Image data read according to each of the bank addresses A0 through A18 is output as the first bank image data output DATA1 through the cluster switches 800-1, 900-1, 800-2, and 900-2 and the bank buffer units 340-1 through 340-4.

In other words, when random or consecutive bank addresses are sequentially input in a pipeline form, image data read according to the bank addresses A0 through A18 are also sequentially output in a pipeline form. At this time, the output order of the image data is the same as the input order of the bank addresses A0 through A18.

In the embodiments illustrated in FIG. 5, latches operate in synchronization with a positive or rising edge of the buffer clock signal SCLK. However, in other embodiments, some or all of the latches may be designed to operate in response to a negative or falling edge of the buffer clock signal SCLK.

Figure 6:
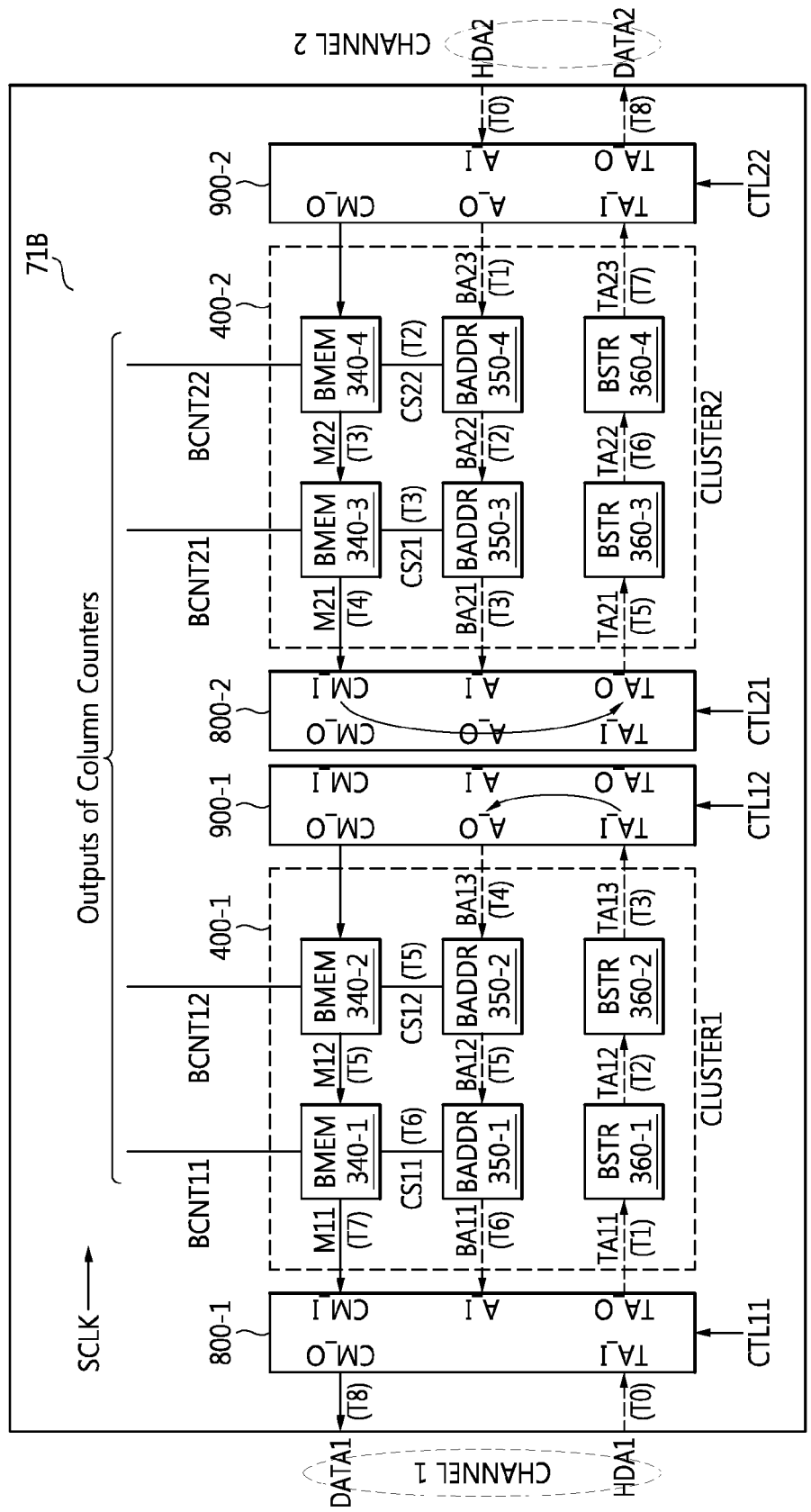
FIG. 6 is a block diagram of an image sensor according to other embodiments of the inventive concepts.

FIG. 6 is a block diagram of an image sensor 71B according to other embodiments of the inventive concepts. The image sensor 71B includes a structure which allows image data to be transmitted from a plurality of column lines either to a single channel or a plurality of channels based on an operation mode. At this time, the image sensor 71B may perform transmission using a plurality of channels CHANNEL1 and CHANNEL2.

Referring to FIG. 6, the image sensor 71B includes a first cluster 400-1, a second cluster 400-2, a first cluster switch 800-1, a second cluster switch 900-1, a third cluster switch 800-2, and a fourth cluster switch 900-2.

The first cluster 400-1 may include the bank buffer units 340-1 and 340-2, the bank address units 350-1 and 350-2, and the bank storage units 360-1 and 360-2. The second cluster 400-2 may include the bank buffer units 340-3 and 340-4, the bank address units 350-3 and 350-4, and the bank storage units 360-3 and 360-4.

The structure and the operations of the elements 340-1 through 340-4, 350-1 through 350-4, 360-1 through 360-4, 800-1, 900-1, 800-2, and 900-2 illustrated in FIG. 6 are substantially the same as those of the elements 340-1 through 340-4, 350-1 through 350-4, 360-1 through 360-4, 800-1, 900-1, 800-2, and 900-2 illustrated in FIG. 4, and therefore, detailed descriptions thereof will be omitted.

Outputting image data through the channels CHANNEL1 and CHANNEL2 will be described, focusing on the operations of the cluster switches 800-1, 900-1, 800-2, and 900-2 below.

Referring to FIG. 6, the image sensor 71B outputs image data through the channels CHANNEL1 and CHANNEL2 in a second operation mode. The second operation mode may be set through the setting of an external pin of the image sensor 71B or interface with an external controller. The interface may be CCI, which may operate according to a protocol such as SPI or I2C, but the inventive concepts are not restricted thereto.

The second operation mode influences the switch control signals CTL11, CTL12, CTL21, and CTL22 and thus controls the flow of a bank address and/or image data in the image sensor 71B. In the second operation mode, the image sensor 71B outputs image data from two independent clusters CLUSTER1 and CLUSTER2, respectively, to the channels CHANNEL1 and CHANNEL2, respectively, according to the switch control signals CTL11, CTL12, CTL21, and CTL22.

Figure 7:
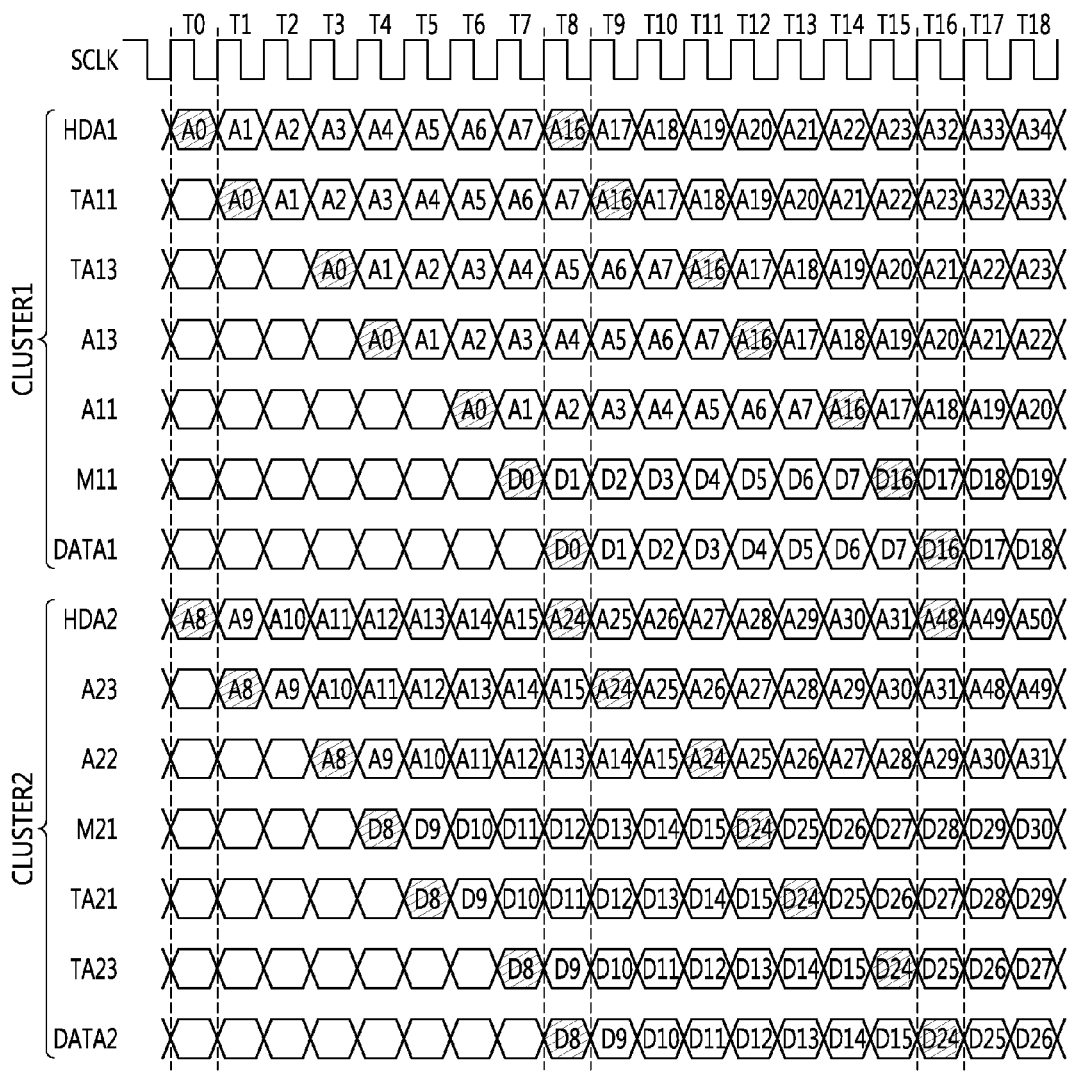
FIG. 7 is a timing chart showing the operation of the image sensor illustrated in FIG. 6.

FIG. 7 is a timing chart showing the operation of the image sensor 71B illustrated in FIG. 6. Referring to FIGS. 6 and 7, the image sensor 71B receives a first bank address A0 from a first bank address input HDA1 of the first channel CHANNEL1 and transmits the first bank address A0 to a first address input TA_I of the first cluster switch 800-1 at a first clock cycle T0.

At second through fourth clock cycles T1 through T3, the first bank address A0 is shifted sequentially by the first cluster switch 800-1, the first bank storage unit 360-1, and the second bank storage unit 360-2 to be transmitted to a first address input TA_I of the second cluster switch 900-1.

The first bank address A0 is transmitted from the first address input TA1 to a second address output A_O in the second cluster switch 900-1 at a fifth clock cycle T4. The first bank address A0 is shifted sequentially to the second bank address unit 350-2 and the first bank address unit 350-1 at sixth and seventh clock cycles T5 and T6, respectively.

During sixth through eighth clock cycles T5 through T7, the second bank buffer unit 340-2 and the first bank buffer unit 340-1 sequentially shift first image data D0 based on the first bank address A0 to transmit the first image data D0 to an image data input CM_I. At a ninth clock cycle T8, the first cluster switch 800-1 outputs the first image data D0 as the first bank image data output DATA1 through an output CM_O.

Similarly, at the first clock cycle T0, the image sensor 71B receives a ninth bank address A8 through a second bank address input HDA2 of the second channel CHANNEL2 and transmits the ninth bank address A8 to a second bank address input A_I of the fourth cluster switch 900-2.

During the second through fourth clock cycles T1 through T3, a ninth bank address A8 is shifted sequentially to the fourth cluster switch 900-2, the fourth bank address unit 350-4, and the third bank address unit 360-3, so that the ninth bank address A8 is transmitted to a second address input A_I of the third cluster switch 800-2. During the third through fifth clock cycles T2 through T4, the fourth bank buffer unit 340-4 and the third bank buffer unit 340-3 sequentially shift ninth image data D8 based on the ninth bank address A8, so that the ninth image data D8 is transmitted to an image data input CM_I of the third cluster switch 800-2.

At the sixth clock cycle T5, the third cluster switch 800-2 outputs the ninth image data D8 through a first address output TA_O. During the seventh and eighth clock cycles T6 and T7, the third bank storage unit 360-3 and the fourth bank storage unit 360-4 sequentially shift the ninth image data DS8, so that the ninth image data D8 is transmitted to a first address input TA_I of the fourth cluster switch 900-4. At the ninth clock cycle 18, the fourth cluster switch 900-4 outputs the ninth image data D8 as a second bank image data output DATA2 of the image sensor 71B through an output TA_O.

The first bank address input HDA1 and the first bank image data output DATA1 form the first channel CHANNEL1 of the image sensor 71B and the second bank address input HDA2 and the second bank image data output DATA2 form the second channel CHANNEL2 of the image sensor 71B. Referring to FIG. 2, the first bank image data output DATA1 may be transmitted via the first PHY 60-1 to the first ISP 80-1 connected through the first channel CHANNEL1 and the second bank image data output DATA2 may be transmitted via the second PHY 60-2 to the second ISP 80-2 connected through the second channel CHANNEL2.

As described above, the image sensor 71B performs an operation of outputting image data using a plurality of the channels CHANNEL1 and CHANNEL2 in the second operation mode. The image sensor 71B may receive bank addresses input in random order or in consecutive order through the channels CHANNEL1 and CHANNEL2 and may output image data, which correspond to the respective bank addresses respectively received through the channels CHANNEL1 and CHANNEL2, through the channels CHANNEL1 and CHANNEL2, respectively 7, at the same time.

Referring to FIGS. 3, 6, and 7, the image sensor 71B receives the first bank address A0 through the first bank address input HDA1 and the ninth bank address A8 through the second bank address input HDA2 in synchronization with the buffer clock SCLK at the first clock cycle T0.

In this manner, pairs of bank addresses A0 through A50 may be input to the image sensor 71B at respective clock cycles in a pipeline form. Each of the bank addresses A0 through A50 is transmitted sequentially through some among the cluster switches 800-1, 900-1, 800-2, and 900-2, the bank address units 350-1 through 350-4, and the bank storage units 360-1 through 360-4.

Image data D0 through D50 read according to the bank addresses A0 through A50 are sequentially output as first bank image data outputs DATA1 and the second bank image data outputs DATA2 through the bank buffer units 340-1 through 340-4 and the cluster switches 800-1, 900-1, 800-2, and 900-2.

In other words, when the bank addresses A0 through A50 are sequentially input in a pipeline form, the image data D0 through D50 read according to the bank addresses A0 through A50, respectively, are sequentially output in a pipeline form. At this time, the input order of the image data D0 through D50 is the same as the input order of the bank addresses A0 through A50.

It has been described with reference to FIG. 7 that latches included in the image sensor 71B illustrated in FIG. 6 operate in response to a positive edge or rising edge of the buffer clock signal SCLK. However, some or all of the latches may be designed to operate in response to a negative edge or falling edge of the buffer clock signal SCLK FIG. 8 is a block diagram of a first cluster switch 800 according to some embodiments of the inventive concepts. The first cluster switch 800 includes a first latch 810, a second latch 820, a third latch 830, and a selector 840. The first cluster switch 800 may represent the cluster switches 800-1 and 800-2 illustrated in FIG. 4 or 6. The selector 840 selects and outputs one among bank image data input through the image data input CM_I and a first bank address input through the first address input TA_I.

The first latch 810 receives and latches an output of the selector 840 and outputs a latched value to the first address output TA_O. The second latch 820 latches a second bank address received through the second address input A_I and outputs the latched second bank address to the second address output A_O.

The third latch 830 latches the image data received through the image data input CM_I and outputs the latched image data to the image data output CM_O. When a selection signal CTL for the selector 840 is at a first logic level (e.g., a ground voltage), the selector 840 selects and outputs the bank image data to the first latch 810.

When the selection signal CTL is at a second logic level (e.g., a power supply voltage), the selector 840 selects and outputs the first bank address to the first latch 810. The first cluster switch 800 transfers a bank address and image data of the first and second clusters 400-1 and 400-2, as described with reference to FIG. 4.

A bank address and image data are latched by the latches 810, 820, and 830 when they are transferred in the embodiments described above, but the inventive concepts is not restricted to these embodiments. When there is no restriction on the transfer of a bank address and image data, at least one of the latches 810, 820, and 830 may be omitted and either the bank address or the image data may not be transferred without being stored.

Figure 9:
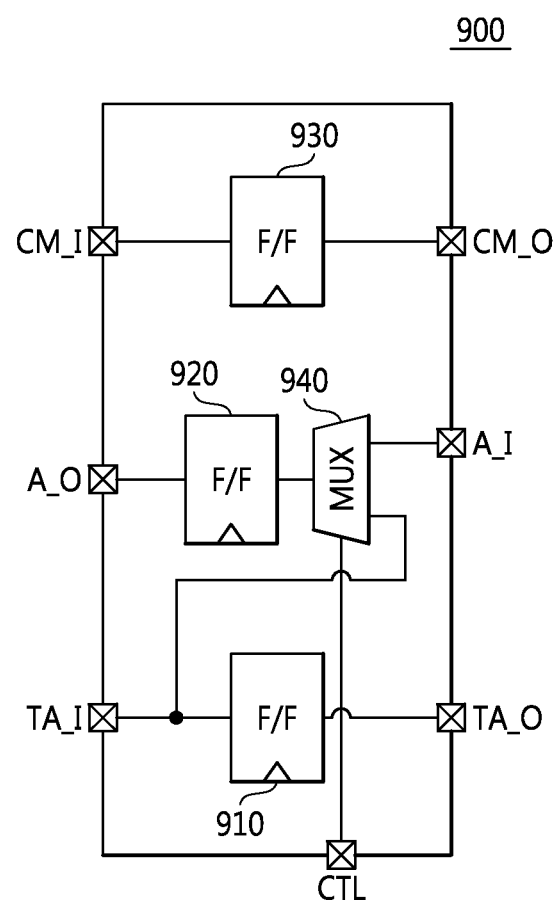
FIG. 9 is a block diagram of a second cluster switch according to some embodiments of the inventive concepts.

FIG. 9 is a block diagram of a second cluster switch 900 according to some embodiments of the inventive concepts. Referring to FIG. 9, the second cluster switch 900 includes a first latch 910, a second latch 920, a third latch 930, and a selector 940. The second cluster switch 900 may represent the cluster switches 900-1 and 900-2 illustrated in FIG. 4 or 6.

The first latch 910 latches a first bank address received through the first address input TA_I and outputs the latched first bank address to the first address output TA_O. The selector 940 selects and outputs either a second bank address received through the second address input A_I or the first bank address.

The second latch 930 receives and latches an output of the selector 940 and outputs a latched value to the second address output A_O. When a selection signal CTL is at a first logic level (e.g., the ground voltage), the selector 940 selects and outputs the second bank address. When the selection signal CTL is at a second logic level (e.g., the power supply voltage), the selector 940 selects and outputs the first bank address.

The third latch 930 latches image data received through the image data input CM_I and outputs the latched image data to the image data output CM_O. The second cluster switch 900 transfers a bank address and image data of the first and second clusters 400-1 and 400-2, as described with reference to FIG. 4.

A bank address and image data are latched by the latches 910, 920, and 930 when they are transferred in the embodiments described above, but the inventive concepts is not restricted to these embodiments. When there is no restriction on the transfer of a bank address and image data, at least one of the latches 910, 920, and 930 may be omitted and either the bank address or the image data may not be transferred without being stored.

Figure 8:
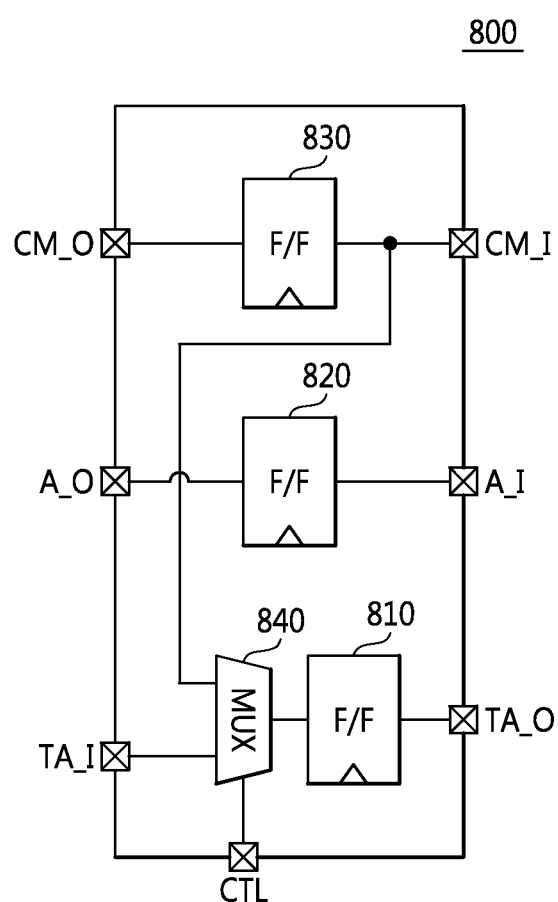
FIG. 8 is a block diagram of a first cluster switch according to some embodiments of the inventive concepts.

The first cluster switch 800 illustrated in FIG. 8 and the second cluster switch 900 illustrated in FIG. 9 may be simplified in some cases or may be integrated into a single cluster switch to increase transmission speed. For instance, when the second and third cluster switches 900-1 and 800-2 illustrated in FIG. 4 are integrated into a single cluster switch, the single cluster switch may have the same structure as the first cluster switch 800-1.

Referring to FIGS. 4 through 9, the selection signal CTL input to each of the cluster switches 800-1, 900-1, 800-2, and 900-2 determines the flow of a bank address and/or image data, which will be transmitted to a single channel or a plurality of channels of the image sensors 71A and 71B according to the operation mode of the image sensors 71A and 71B. Here, the selection signal CTL may represent the selection signals CTL11, CTL12, CTL21, and CTL22.

When the selection signal CTL11 for the first cluster switch 800-1 is at the second logic level (e.g., the power supply voltage), the selection signal CTL12 for the second cluster switch 900-1 is at the first logic level (e.g., the ground voltage), the selection signal CTL21 for the third cluster switch 800-2 is at the second logic level, and the selection signal CTL22 for the fourth cluster switch 900-2 is at the second logic level; the image sensor 71A illustrated in FIG. 4 outputs image data through the single channel CHANNEL1.

However, when the selection signal CTL11 for the first cluster switch 800-1 is at the second logic level, the selection signal CTL12 for the second cluster switch 900-1 is at the second logic level, the selection signal CTL21 for the third cluster switch 800-2 is at the first logic level, and the selection signal CTL22 for the fourth cluster switch 900-2 is at the second logic level; the image sensor 71B illustrated in FIG. 6 outputs image data through a plurality of the channels CHANNEL1 and CHANNEL2. The image sensor 71B has two channels in the embodiments illustrated in FIG. 6, but two or more channels may be provided for the image sensor 71B according to the number of clusters and/or the number of PHYs.

Figure 10:
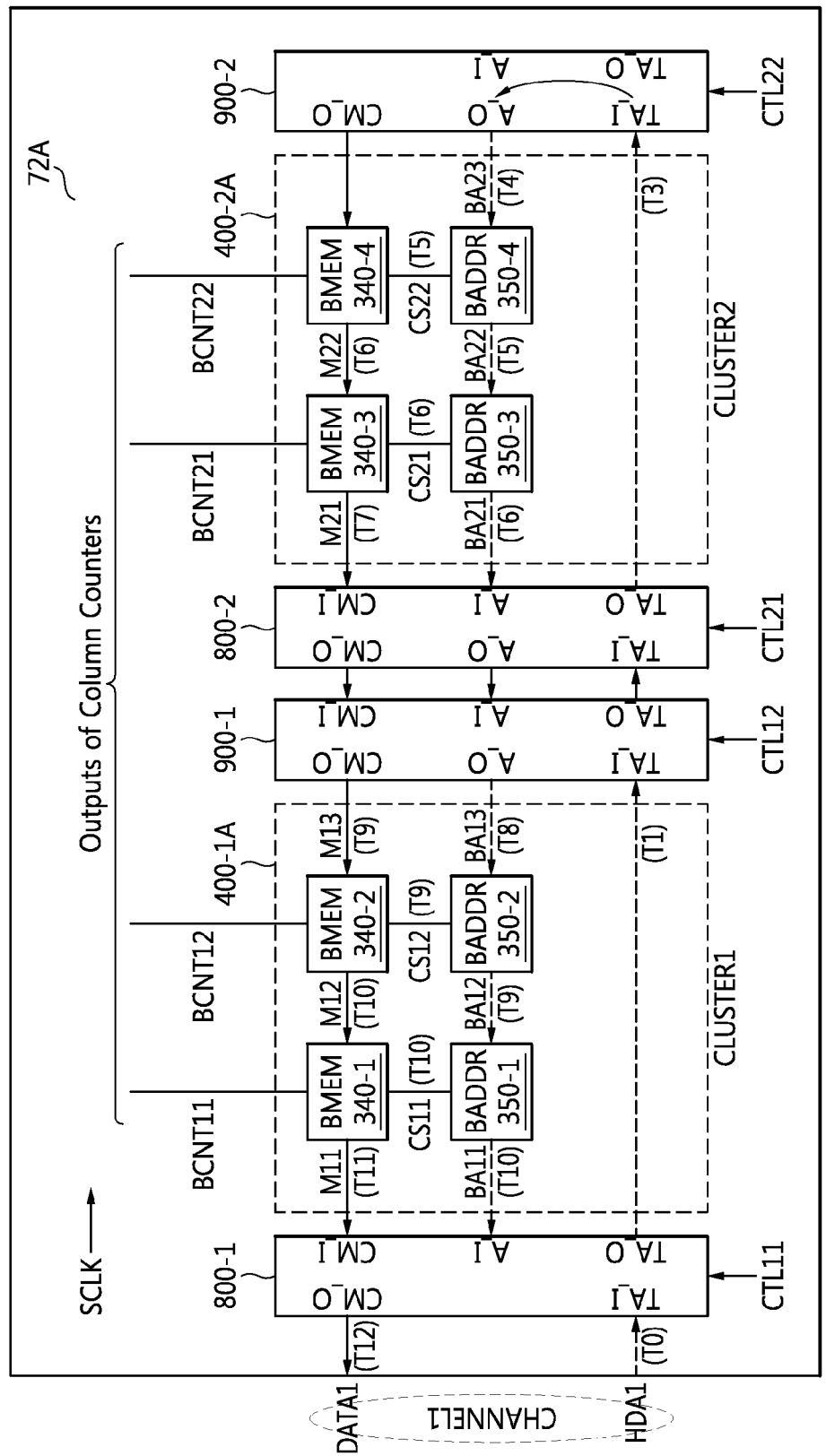
FIG. 10 is a block diagram of an image sensor according to still other embodiments of the inventive concepts.

FIG. 10 is a block diagram of an image sensor 72A according to still other embodiments of the inventive concepts. The image sensor 72A may include a first cluster 400-1A, a second cluster 400-2A, the first cluster switch 800-1, the second cluster switch 900-1, the third cluster switch 800-2, and the fourth cluster switch 900-2. The image sensor 72A illustrated in FIG. 10 may transmit image data through the single channel CHANNEL1.

The first cluster 400-1A may include the bank buffer units 340-1 and 340-2 and the bank address units 350-1 and 350-2. Unlike the first cluster 400-1 illustrated in FIG. 4, the first cluster 400-1A illustrated in FIG. 10 does not include the bank storage units 360-1 and 360-2. The second cluster 400-2A may include the bank buffer units 340-3 and 340-4 and the bank address units 350-3 and 350-4. Unlike the second cluster 400-2 illustrated in FIG. 4, the second cluster 400-2A illustrated in FIG. 10 does not include the bank storage units 360-3 and 360-4.

The structure and the functions of the elements 340-1 through 340-4, 350-1 through 350-4, 800-1, 900-1, 800-2, and 900-2 illustrated in FIG. 10 are substantially the same as those of the elements 340-1 through 340-4, 350-1 through 350-4, 800-1, 900-1, 800-2, and 900-2 illustrated in FIG. 4. Thus, detailed descriptions of the elements 340-1 through 340-4, 350-1 through 350-4, 800-1, 900-1, 800-2, and 900-2 illustrated in FIG. 10 will be omitted and an operation of outputting image data transmitted through a single channel will be described, focusing on the operations of the cluster switches 800-1, 900-1, 800-2, and 900-2.

Referring to FIG. 10, the image sensor 72A outputs image data through one channel CHANNEL1 in a third operation mode. The third operation mode may be set through the setting of an external pin of the image sensor 72A or interface with an external controller. At this time, the interface may be CCI, which may operate according to a protocol such as SPI or I2C, but the inventive concepts are not restricted thereto.

The third operation mode influences the switch control signals CTL11, CT12, CTL21, and CTL22 and thus controls the flow of a bank address and/or image data in the image sensor 72A. In the third operation mode, the image sensor 72A outputs image data to the one channel CHANNEL1 based on the switch control signals CTL11, CTL12, CTL21, and CTL22.

Referring to FIGS. 5 and 10, the image sensor 72A receives the first bank address A0 through the first bank address input HDA1 of the first channel CHANNEL1 and transmits the first bank address A0 to the first address input TA_I of the first cluster switch 800-1 at the first clock cycle T0. The first bank address A0 is input to the first bank address input TA_I of the second cluster switch 900-1 at the second clock cycle T1.

The first bank address A0 is input to the first bank address input TA_I of the third cluster switch 800-2 through the output TA_O of the second cluster switch 900-1 at the third clock cycle T2. The first bank address A0 is input to the first bank address input TA_I of the fourth cluster switch 900-2 through the output TA_O of the third cluster switch 800-2 at the fourth clock cycle T2. The operations afterwards are the same as those described with reference to FIG. 4. Thus, detailed descriptions thereof will be omitted.

Referring to FIG. 10, the image sensor 72A outputs the first image data D0 corresponding to the first bank address A0 through the image data output CM_O of the first cluster switch 800-1 as the first bank image data output DATA1 for the first channel CHANNEL1 at the 13th clock cycle T12.

Figure 11:
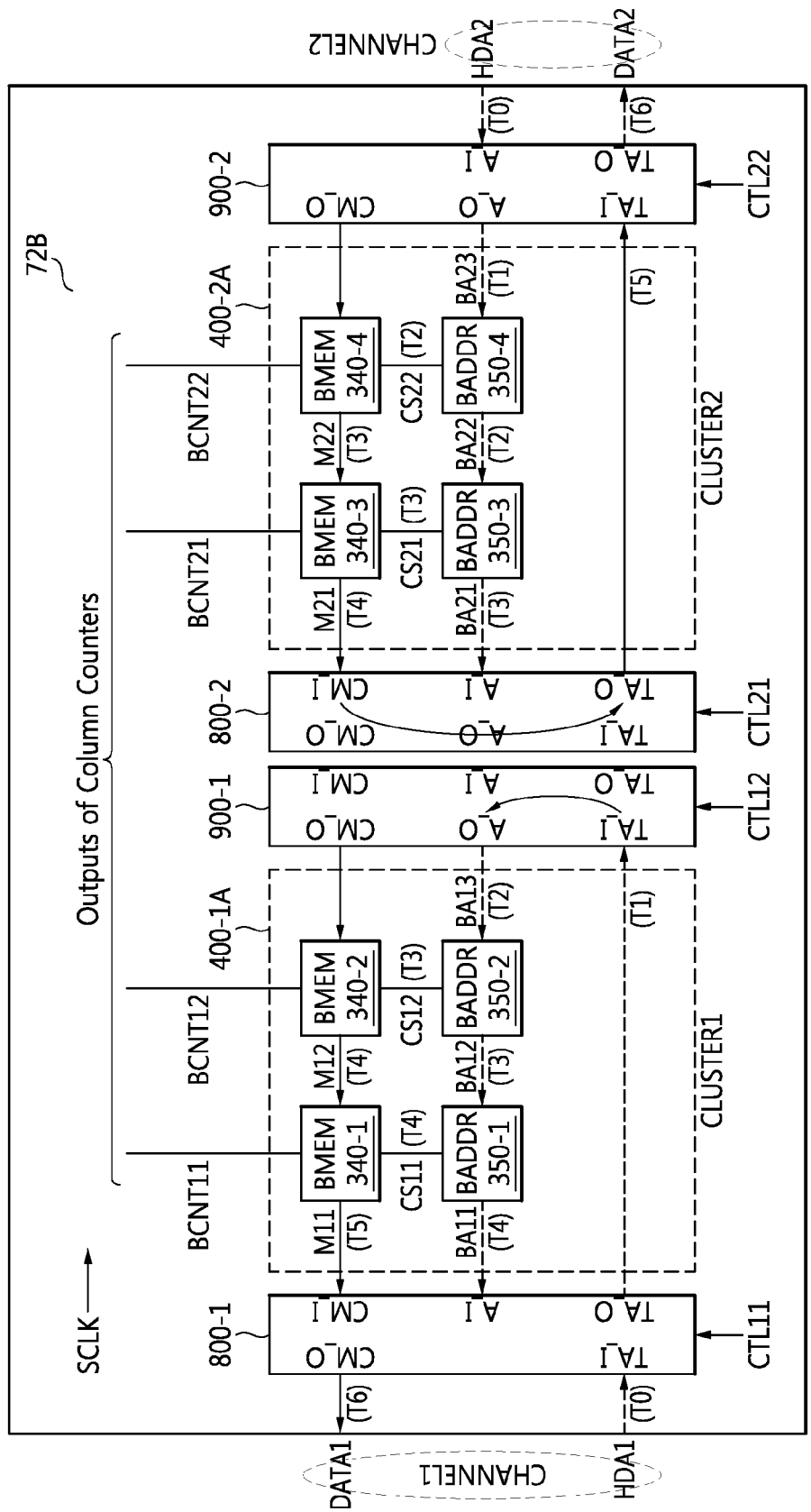
FIG. 11 is a block diagram of an image sensor according to even other embodiments of the inventive concepts.

FIG. 11 is a block diagram of an image sensor 72B according to even other embodiments of the inventive concepts. The image sensor 72B illustrated in FIG. 11 may transmit image data through a plurality of the channels CHANNEL1 and CHANNEL2. The image sensor 72B may include the first cluster 400-1A, the second cluster 400-2A, the first cluster switch 800-1, the second cluster switch 900-1, the third cluster switch 800-2, and the fourth cluster switch 900-2.

The first cluster 400-1A may include the bank buffer units 340-1 and 340-2 and the bank address units 350-1 and 350-2. The second cluster 400-2A may include the bank buffer units 340-3 and 340-4 and the bank address units 350-3 and 350-4.

The structure and the operations of the elements 340-1 through 340-4, 350-1 through 350-4, 800-1, 900-1, 800-2, and 900-2 illustrated in FIG. 11 are substantially the same as those of the elements 340-1 through 340-4, 350-1 through 350-4, 800-1, 900-1, 800-2, and 900-2 illustrated in FIG. 6.

Thus, detailed descriptions of the elements 340-1 through 340-4, 350-1 through 350-4, 800-1, 900-1, 800-2, and 900-2 illustrated in FIG. 11 will be omitted and an operation of outputting image data transmitted through the channels CHANNEL1 and CHANNEL2 using the independent two clusters 400-1A and 400-2A will be described, focusing on the operations of the cluster switches 800-1, 900-1, 800-2, and 900-2.

Referring to FIG. 11, the image sensor 72B outputs image data through two channels CHANNEL1 and CHANNEL2 in a fourth operation mode. The fourth operation mode may be set through the setting of an external pin of the image sensor 72B or interface with an external controller. At this time, the interface may be CCI, which may operate according to a protocol such as SPI or I2C, but the inventive concepts are not restricted thereto.

The fourth operation mode influences the switch control signals CTL11, CTL12, CTL21, and CTL22 and thus controls the flow of a bank address and/or image data in the image sensor 72B. In the fourth operation mode, the image sensor 72B outputs image data to the channels CHANNEL1 and CHANNEL2 based on the switch control signals CTL11, CTL12, CTL21, and CTL22.

Referring to FIGS. 7 and 11, the image sensor 72B receives the first bank address A0 through the first bank address input HDA1 of the first channel CHANNEL1 and transmits the first bank address A0 to the first address input TA_I of the first cluster switch 800-1 at the first clock cycle T0. The first bank address A0 is input to the first bank address input TA_I of the second cluster switch 900-1 through the output TA_O of the first cluster switch 800-1 at the second clock cycle T1. The operations afterwards are the same as or similar to those described with reference to FIGS. 6 and 7. Thus, detailed descriptions thereof will be omitted.

Referring to FIGS. 7 and 11, the image sensor 72B outputs the first image data D0 corresponding to the first bank address A0 through the image data output CM_O of the first cluster switch 800-1 as the first bank image data output DATA1 at the seventh clock cycle T6.

The image sensor 72B receives the ninth bank address A8 through the second bank address input HDA2 of the second channel CHANNEL2 and transmits the ninth bank address A8 to the second bank address input A_I of the fourth cluster switch 900-2 at the first clock cycle T0. The ninth bank address A8 is input to the bank address input BA_I of the fourth bank address unit 350-4 at the second clock cycle T1. The operations afterwards are the same as or similar to those described with reference to FIGS. 6 and 7. Thus, detailed descriptions thereof will be omitted.

Referring to FIGS. 7 and 11, the image sensor 72B transmits the ninth image data D8 corresponding to the ninth bank address A8 from the first bank address output TA_O of the third cluster switch 800-2 to the first bank address input TA_I of the fourth cluster switch 900-2 at the sixth clock cycle T5.

The fourth cluster switch 900-2 outputs the ninth image data D8 as the second bank image data output DATA2 to the second channel CHANNEL2 at the seventh clock cycle T6. Input of the following bank addresses and output of image data corresponding to the following bank addresses are performed in a pipeline form in the same manner as or a similarly manner to that described with reference to FIGS. 6 and 7.

Figure 12:
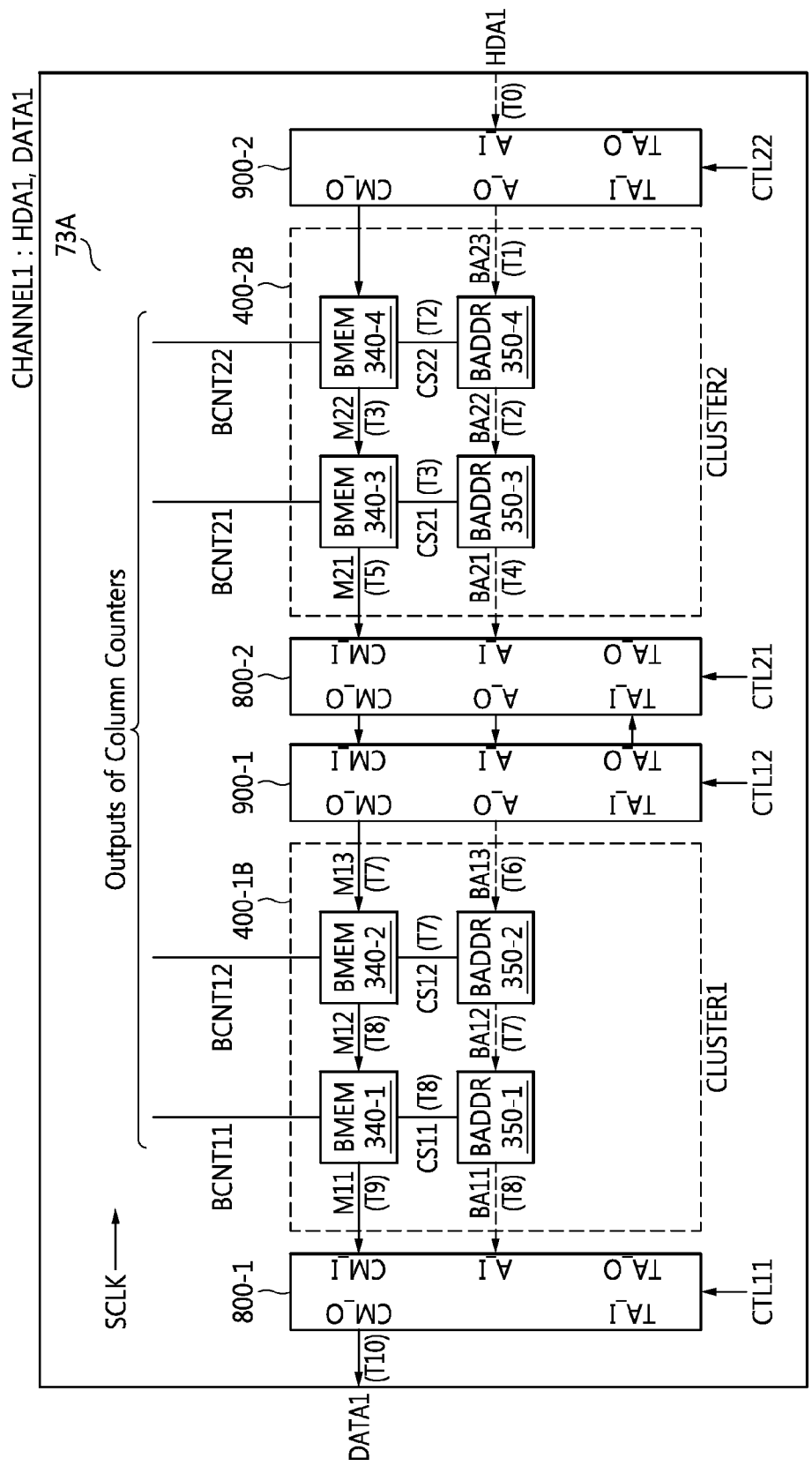
FIG. 12 is a block diagram of an image sensor according to yet other embodiments of the inventive concepts.

FIG. 12 is a block diagram of an image sensor 73A according to yet other embodiments of the inventive concepts. Except for the position of the bank address input HDA1, the structure of the image sensor 73A illustrated in FIG. 12 is substantially the same as those of the image sensor 72A illustrated in FIG. 10. In detail, a bank address is input to the second bank address input A_I of the fourth cluster switch 900-2 through the bank address input HDA1 of the first channel CHANNEL1.

The fundamental operations of the image sensor 73A illustrated in FIG. 12 are similar to those described with reference to FIGS. 4, 6, 10, and 11. Thus, detailed descriptions of the image sensor 73A will be omitted. However, image data is output at the eleventh clock cycle T10.

Figure 13:
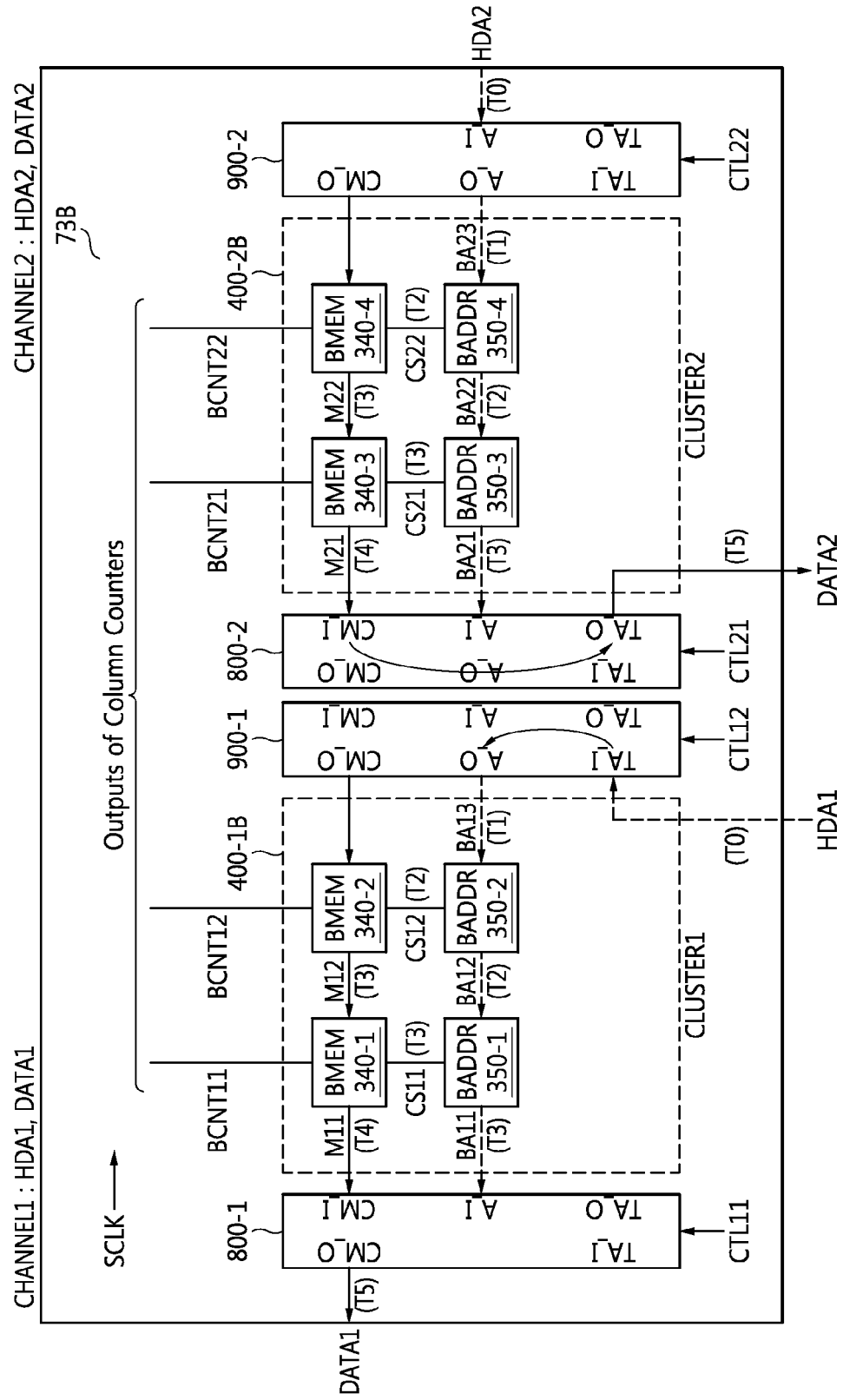
FIG. 13 is a block diagram of an image sensor according to further embodiments of the inventive concepts.

FIG. 13 is a block diagram of an image sensor 73B according to further embodiments of the inventive concepts. The image sensor 73B illustrated in FIG. 13 may perform image data transmission using a plurality of the channels CHANNEL1 and CHANNEL2. Except for the position of the bank address input HDA1 and the image data output DATA2, the structure of the image sensor 73B illustrated in FIG. 13 is substantially the same as that of the image sensor 72B illustrated in FIG. 11.

A bank address is input to the first bank address input TA_I of the second cluster switch 900-1 through the bank address input HDA1 of the first channel CHANNEL1. Image data corresponding to the second bank image data output DATA2 is output through the first bank address output TA_O of the third cluster switch 800-2.

Even when there are more than two channels, an image sensor operating with a plurality of channels may be realized depending on setting a position of a cluster switch through which a bank address is input and a position of a cluster switch through which image data corresponding to the bank address is output.

The fundamental operations of the image sensor 73B illustrated in FIG. 13 are similar to those described with reference to FIGS. 4, 6, 10, and 11. Thus, detailed descriptions of the image sensor 73B will be omitted. However, the first bank image data DATA1 and the second bank image data DATA2 are output at the sixth clock cycle T5.

Figure 14:
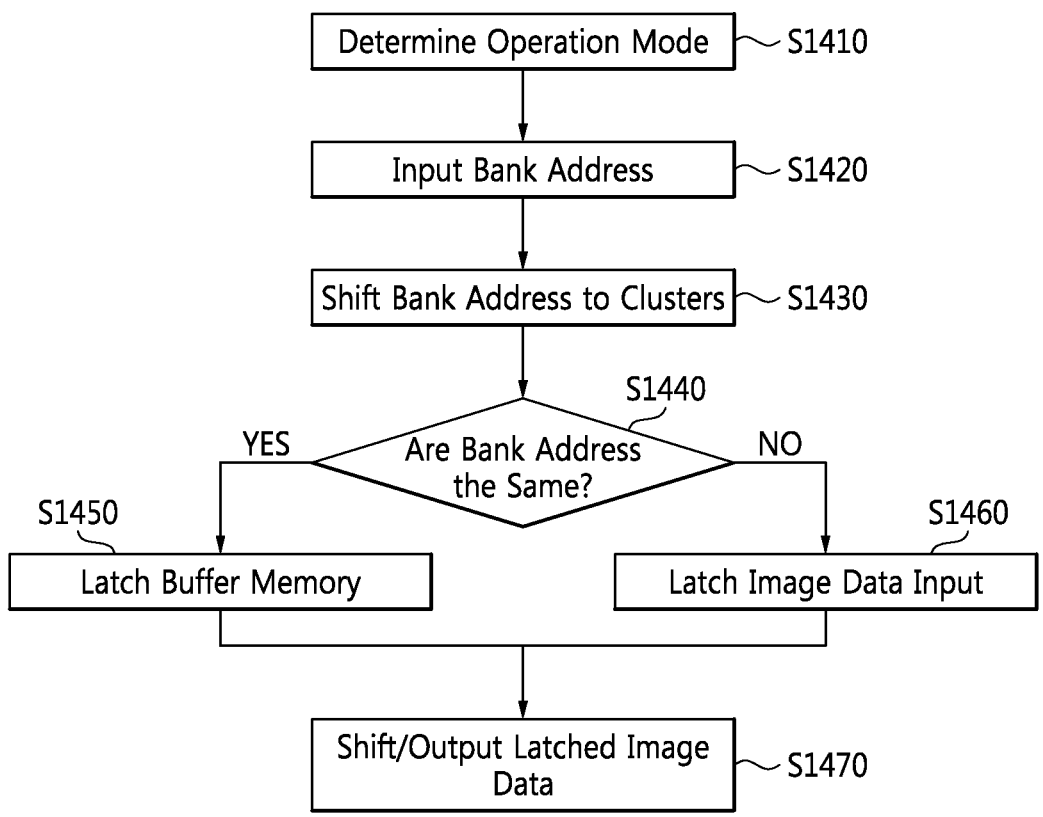
FIG. 14 is a flowchart of an image data latching operation of an image sensor according to some embodiments of the inventive concepts.

FIG. 14 is a flowchart of an image data latching operation of the image sensor 71A, 71B, 72A, 72B, 73A, or 73B according to some embodiments of the inventive concepts. Referring to FIGS. 1 through 14, an operation mode is determined in operation S1410. The operation mode may be one of the first through fourth operation modes.

A bank address is input to least one of the first and second bank address inputs HDA1 and HDA2 through the operations of the clusters 40-1 and 40-2 or 400-1 and 400-2 and the cluster switches 800-1, 900-1, 800-2, and 900-2 based on the operation mode in operation S1420. The first cluster 400-1 collectively denotes the clusters 400-1A and 400-1B and the second cluster 400-2 collectively denotes the clusters 400-2A and 400-2B.

According to the operation mode, consecutive bank addresses are transmitted in random order or sequential order to the clusters 40-1 and 40-2 or 400-1 and 400-2 through at least one of the first and second channels CHANNEL1 and CHANNEL2 in operation S1430. The bank address that has been input is compared with a bank address assigned to each of the buffer banks 41-1 and 41-2 or 300 included in the clusters 40-1 and 40-2 or 400-1 and 400-2, respectively, in operation S1440.

Either first image data output from the buffer memories 42-1 and 42-2 or 340-1 through 340-4 included in the buffer banks 41-1 and 41-2 or 300, respectively, or second image data received from a previous bank is selectively latched based on the comparison result in operations S1450 and S1460. Latched image data is shifted and output to the first or second channel CHANNEL1 or CHANNEL2 in operation S1470.

Figure 15:
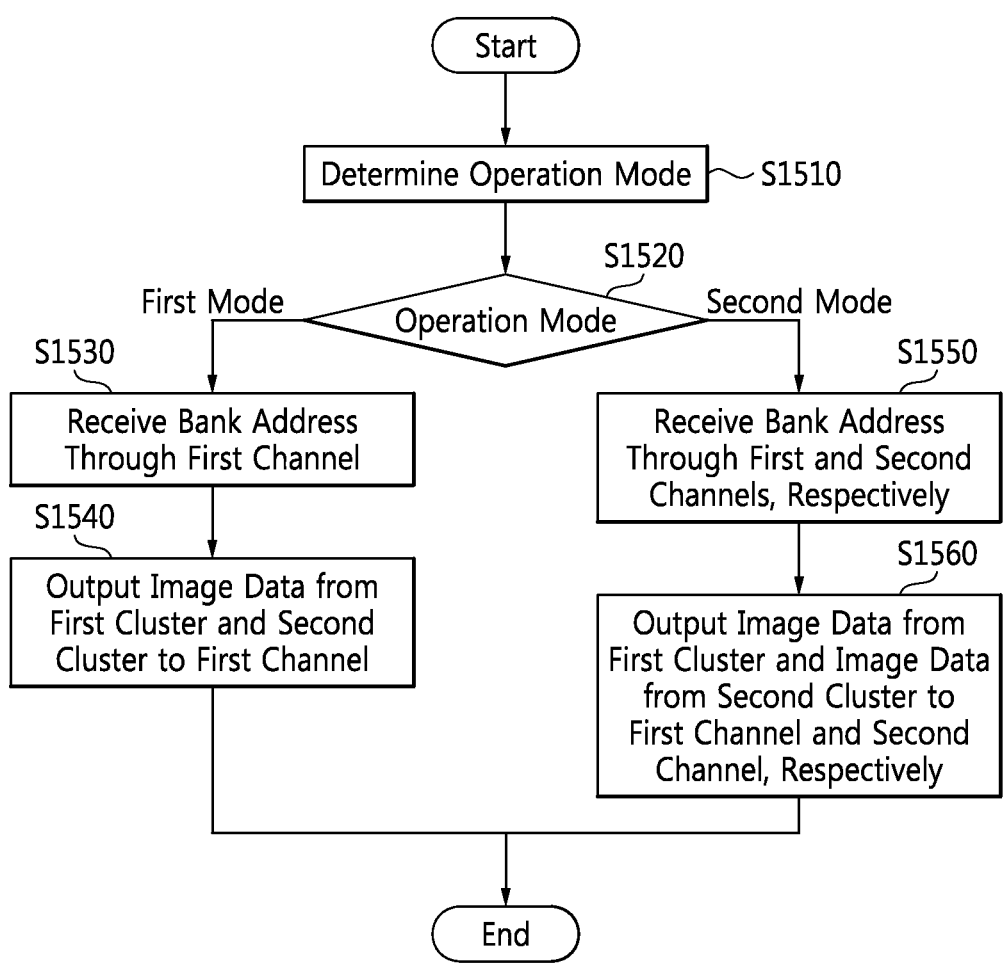
FIG. 15 is a flowchart of a variable channel output operation of an image sensor according to some embodiments of the inventive concepts.

FIG. 15 is a flowchart of a variable channel output operation of an image sensor according to some embodiments of the inventive concepts. Referring to FIG. 15, an operation mode is determined in operation S1510. In order to set the operation mode, a voltage of an external pin of the image sensor may be set or operation mode information may be input to the image sensor from an external device (e.g., an application processor) through interface (e.g., CCI) of a controller for the image sensor. It is determined whether the operation mode is a first operation mode or a second operation mode in operation S1520.

When the operation mode is the first operation mode, the image sensor receives the first bank address A0 through the first bank address input HDA1 of the first channel CHANNEL1 according to random order or sequential order in operation S1530. The image sensor shifts and outputs image data output from the first cluster 40-1 or 400-1 and the second cluster 40-2 or 400-2 as the first bank image data output DATA1 of the first channel CHANNEL1 in operation S1540.

When the operation mode is the second operation mode, the image sensor receives in random or sequential order a first bank address and a second bank address independently through the first bank address input HDA1 of the first channel CHANNEL1 and the second bank address input HDA2 of the second channel CHANNEL2, respectively, in operation S1550. The image sensor shifts and outputs image data from the first cluster 40-1 and image data from the second cluster 40-2 as the first bank image data output DATA1 and the second bank image data output DATA2 to the first channel CHANNEL1 and the second channel CHANNEL2, respectively, in operation S1560.

Figure 16:
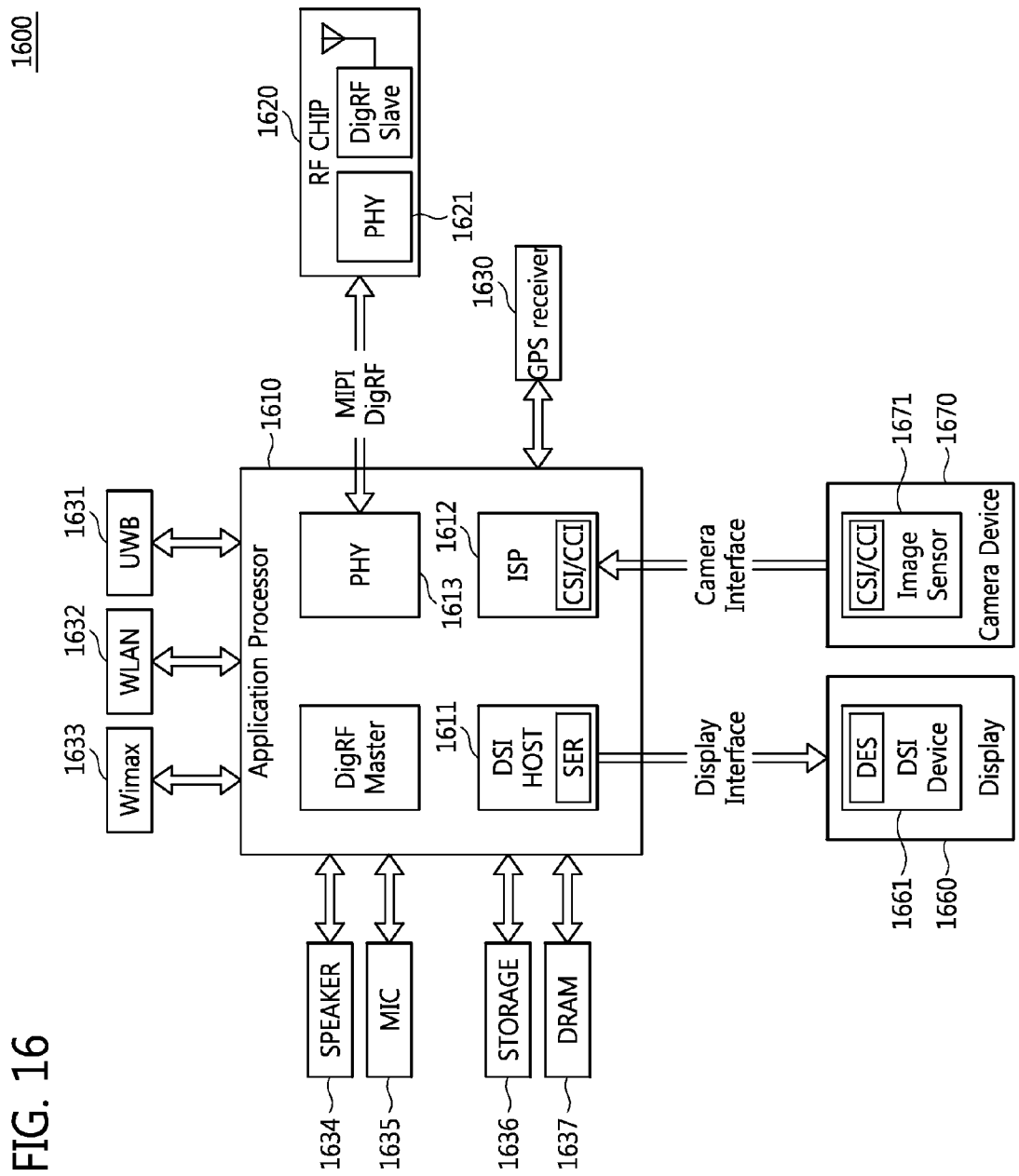
FIG. 16 is a diagram of an electronic system and interface according to some embodiments of the inventive concepts.

FIG. 16 is a diagram of an electronic system 1600, which includes an image sensor, and interface according to some embodiments of the inventive concepts. Referring to FIGS. 1 through 16, the electronic system 1600 may be implemented as a data processing device, such as a mobile phone, a personal digital assistant (PDA), a portable media player (PMP), or a smart phone, which can use or support mobile industry processor interface (MIPI®).

The electronic system 1600 includes an application processor 1610, an image sensor 1671, and a display 1660. An ISP 1612 included in the application processor 1610 may perform serial communication with the image sensor 1671 included in a camera device 1670 through a camera serial interface (CSI). At this time, the ISP 1612 and the image sensor 1671 may include a CCI to transmit and receive control information.

The application processor 1610 may set an operation mode for the image sensor 1671 transmitting image data through a single channel or a plurality of channels through the CCI. The CSI and the CCI may be formed on the same silicon substrate as the image sensor 1671. In addition, the camera device 1670 may be a camera module and the CCI may be implemented as SPI or I2C, but inventive concepts are not restricted thereto. The image sensor 1671 may be the image sensor 71A, 71B, 72A, 72B, 73A, or 73B described above.

A display serial interface (DSI) host 1611 included in the application processor 1610 may perform serial communication with a DSI device 1661 included in the display 1660 through DSI. At this time, a serializer SER and a deserializer DES may be formed in the DSI host 1611 and the DSI device 1661, respectively. The serializer SER and the deserializer DES may communicate signals electrically or optically.

The electronic system 1600 may also include a radio frequency (RF) chip 1620 communicating with the application processor 1610. A PHY 1613 of the application processor 1610 and a PHY 1621 of the RF chip 1620 may communicate data with each other according to MIPI DigRF.

The electronic system 1600 may further include a global positioning system (GPS) receiver 1630, a storage 1636, a microphone (MIC) 1635, a dynamic random access memory (DRAM) 1637, and a speaker 1634. The electronic system 1600 may communicate using a worldwide interoperability for microwave access (Wimax) 1633, a wireless local area network (WLAN) 1632, and an ultra-wideband (UWB) 1631.

A channel described in the embodiments of the inventive concepts may indicate a physical transmission path through which data is transmitted or may indicate data itself.

As described above, according to some embodiments of the inventive concepts, when transmitting image data generated by a plurality of pixels, an image sensor groups a plurality of pixel columns included in the image sensor into clusters and adjusts a transmission channel for image data corresponding to each of the clusters, thereby variably adjusting transmission speed of the image data, transmission direction of the image data, and/or the number of transmission channels for the image data. In addition, the image sensor includes a switch that can changes the transmission path based on a control signal received through an external controller or an external pin, so that image sensor variably adjusts the transmission speed of the image data, the transmission direction of the image data, and/or the number of transmission channels for the image data. Moreover, since the image sensor divides the structure of an internal buffer memory into banks or clusters, so that the image sensor can easily change the transmission path for the image data.

While the inventive concepts has been particularly shown and described with reference to example embodiments thereof, it will be understood by those of ordinary skill in the art that various changes in forms and details may be made therein without departing from the spirit and scope of the inventive concepts as defined by the following claims.

What is claimed is:
1. An image sensor comprising:
a pixel array having a plurality of pixels;
an analog-to-digital converter configured to convert analog pixel signals output from the pixels into digital signals;
a first cluster configured to store a first group of digital signals among the digital signals and to output first image data;
a second cluster configured to store a second group of digital signals among the digital signals and to output second image data;
at least one cluster switch connected to the first cluster and the second cluster;
a first channel configured to transmit image data according to a first communication protocol;
a second channel configured to transmit image data according to a second communication protocol;
a first physical layer (PHY) connected between the first channel and a first sense amplifier, the first PHY configured to change a communication protocol of output signals of the first sense amplifier; and
a second PHY connected between the second channel and a second sense amplifier, the second PHY configured to change a communication protocol of output signals of the second sense amplifier; wherein
the image sensor is configured to transmit at least one of the first image data and the second image data to at least one of the first channel and the second channel based on an operation model, and
the first cluster includes,
a first buffer memory block configured to receive and store the first group of digital signals,
a first data bus,
a plurality of first column switches configured to transmit the first group of digital signals from the first buffer memory block to the first data bus,
the first sense amplifier connected to the first channel, and
a first bus switch connected between the first data bus and the first sense amplifier;
the second cluster includes,
a second buffer memory block configured to receive and store the second group of digital signals,
a second data bus,
a plurality of second column switches configured to transmit the second group of digital signals from the second buffer memory block to the second data bus,
the second sense amplifier connected to the second channel, and
a second bus switch connected between the second data bus and the second sense amplifier, and
the at least one cluster switch is connected between the first data bus and the second data bus.
2. The image sensor of claim 1, wherein the at least one cluster switch is always in an on-state.
3. The image sensor of claim 1, wherein the at least one cluster switch comprises:
a first cluster switch connected between the first channel and the first cluster;
a second cluster switch and a third cluster switch connected in series between the first cluster and the second cluster; and
a fourth cluster switch connected between the second cluster and the second channel.
4. The image sensor of claim 3, wherein the first cluster comprises a plurality of first bank buffer units connected in series between the first cluster switch and the second cluster switch;
the second cluster comprises a plurality of second bank buffer units connected in series between the third cluster switch and the fourth cluster switch; and
image data processed by each of the second bank buffer units is transmitted to each of the first bank buffer units through the second and third cluster switches, which are connected to each other, based on the operation mode.
5. The image sensor of claim 4, wherein a bank address, which is transmitted to at least one of the first bank buffer units and the second bank buffer units, is input to one of the first cluster switch and the fourth cluster switch.
6. An image sensor comprising:
a pixel array having a plurality of pixels;
an analog-to-digital converter configured to convert analog pixel signals output from the pixels into digital signals;
a first cluster configured to store a first group of digital signals among the digital signals and to output first image data;
a second cluster configured to store a second group of digital signals among the digital signals and to output second image data;
at least one cluster switch connected to the first cluster and the second cluster;
a first channel configured to transmit image data according to a first communication protocol; and
a second channel configured to transmit image data according to a second communication protocol, wherein the image sensor is configured to transmit at least one of the first image data and the second image data to at least one of the first channel and the second channel based on an operation mode, the first cluster includes a plurality of first bank buffer units connected in series between a first cluster switch connected to the first channel and a second cluster switch, the second cluster includes a plurality of second bank buffer units connected in series between a third cluster switch and a fourth cluster switch connected to the second channel, the second cluster switch is disconnected from the third cluster switch based on the operation mode, image data processed by each of the first bank buffer units is transmitted to the first channel through the first cluster switch, and image data processed by each of the second bank buffer units is transmitted to the second channel through the fourth cluster switch.

7. The image sensor of claim 1, wherein
the first cluster comprises a plurality of first bank buffer units connected in series between a first cluster switch connected to the first channel and a second cluster switch, the second cluster comprises a plurality of second bank buffer units connected in series between a third cluster switch and a fourth cluster switch connected to the second channel, the second cluster switch is disconnected from the third cluster switch based on the operation mode, image data processed by each of the first bank buffer units is transmitted to the first channel through the first cluster switch, image data processed by each of the second bank buffer units is transmitted to the second channel through the third cluster switch, a first bank address transmitted to the first bank buffer units is input through the second cluster switch, and a second bank address transmitted to the second bank buffer units is input through the fourth cluster switch.

8. An image processing system comprising:
an image sensor; and
a first image signal processor connected with the image sensor through a first channel, the first channel configured to transmit image data according to a first communication protocol, a second image signal processor connected to a second cluster through a second channel;

a first physical layer (PHY) connected between the first channel and a first sense amplifier, the first PHY configured to change a communication protocol of output signals of the first sense amplifier; and a second PHY connected between the second channel and a second sense amplifier, the second PHY configured to change a communication protocol of output signals of the second sense amplifier; wherein the image sensor includes,
   a pixel array comprising a plurality of pixels;
   an analog-to-digital converter configured to convert analog pixel signals output from the pixels into digital signals;
   a first cluster connected to the first channel to store and output a first group of digital signals of the digital signals;
   the second cluster configured to store and output a second group of digital signals of the digital signals; and
   at least one cluster switch connected between the first cluster and the second cluster; the first cluster includes,
     a first buffer memory block configured to receive and store the first group of digital signals,
     a first data bus,
     a plurality of first column switches configured to transmit the first group of digital signals from the first buffer memory block to the first data bus,
     the first sense amplifier connected to the first channel, and
     a first bus switch connected between the first data bus and the first sense amplifier;

the second cluster is connected to the first image signal processor through the second channel, the second channel configured to transmit image data according to a second communication protocol, and the second cluster includes,
   a second buffer memory block configured to receive and store the second group of digital signals,
   a second data bus,
   a plurality of second column switches configured to transmit the second group of digital signals from the second buffer memory block to the second data bus,
   the second sense amplifier connected to the second channel, and
   a second bus switch connected between the second data bus and the second sense amplifier.

9. The image sensor of claim 1, wherein
the first buffer memory block includes,
   a plurality of first bank buffer units connected as a pipeline and each configured to selectively store the first group of digital signals as the first image data based on the operation mode, and
   a plurality of first storage units connected as a pipeline and each configured to shift an external bank input address and the first image data based on the operation mode; and the second buffer memory block includes,
   a plurality of second bank buffer units connected as a pipeline and each configured to selectively store the second group of digital signals as the second image data based on the operation mode, and
   a plurality of second storage units connected as a pipeline and each configured to shift the external bank input address and the second image data based on the operation mode.

10. The image sensor of claim 1, wherein
the operation mode includes at least a first operation mode and a second operation mode, the first operation mode causing the first channel to transmit the first image data and the second channel to not transmit, and the second operation mode causing the first channel to transmit the first image data and the second channel to transmit the second image data.

11. The image sensor of claim 1, wherein
the first cluster is configured to receive a first bank address through the first channel and output image data associated with the first bank address as the first image data.

12. The image sensor of claim 1, wherein
the first cluster is configured to receive a first bank address through the first channel and output image data associated with the first bank address as the first image data based on the operation mode; and the second cluster is configured to receive a second bank address through the second channel and output image data associated with the second bank address as the second image data based on the operation mode.

13. The image sensor of claim 6, wherein
the first cluster includes a plurality of first storage units connected as a pipeline and each configured to shift an external bank input address and the first image data based on the operation mode; and
the second cluster includes a plurality of second storage units connected as a pipeline and each configured to shift the external bank input address and the second image data based on the operation mode.

14. The image sensor of claim 6, wherein
the operation mode includes at least a first operation mode and a second operation mode,
 the first operation mode causing the first channel to transmit the first image data and the second channel to not transmit, and
 the second operation mode causing the first channel to transmit the first image data and the second channel to transmit the second image data.

15. The image sensor of claim 6, wherein
the first cluster is configured to receive a first bank address through the first channel and output image data associated with the first bank address as the first image data.

16. The image sensor of claim 6, wherein
the first cluster is configured to receive a first bank address through the first channel and output image data associated with the first bank address as the first image data based on the operation mode; and
the second cluster is configured to receive a second bank address through the second channel and output image data associated with the second bank address as the second image data based on the operation mode.

17. The image processing system of claim 8, wherein
the first buffer memory block includes,
 a plurality of first bank buffer units connected as a pipeline and each configured to selectively store the first group of digital signals as the first image data based on the operation mode, and
 a plurality of first storage units connected as a pipeline and each configured to shift an external bank input address and the first image data based on the operation mode; and
the second buffer memory block includes,
 a plurality of second bank buffer units connected as a pipeline and each configured to selectively store the second group of digital signals as the second image data based on the operation mode, and
 a plurality of second storage units connected as a pipeline and each configured to shift the external bank input address and the second image data based on the operation mode.

18. The image processing system of claim 8, wherein
the operation mode includes at least a first operation mode and a second operation mode,
 the first operation mode causing the first channel to transmit the first image data and the second channel to not transmit, and
 the second operation mode causing the first channel to transmit the first image data and the second channel to transmit the second image data.

19. The image processing system of claim 8, wherein
the first cluster is configured to receive a first bank address through the first channel and output image data associated with the first bank address as the first image data.

20. The image processing system of claim 8, wherein
the first cluster is configured to receive a first bank address through the first channel and output image data associated with the first bank address as the first image data based on the operation mode; and
the second cluster is configured to receive a second bank address through the second channel and output image data associated with the second bank address as the second image data based on the operation mode.

* * * * *